United States Patent
Takaishi et al.

(10) Patent No.: US 9,881,046 B2
(45) Date of Patent: Jan. 30, 2018

(54) RECORDING MEDIUM HAVING STORED THEREIN PROCESS MANAGING PROGRAM, PROCESS MANAGING APPARATUS AND PROCESS MANAGING METHOD

(71) Applicant: FUJITSU LIMITED, Kawasaki-shi, Kanagawa (JP)

(72) Inventors: Akinobu Takaishi, Kobe (JP); Shotaro Okada, Nishinomiya (JP); Toru Kitayama, Kobe (JP); Toshitsugu Mori, Akashi (JP); Ryota Kawagata, Kobe (JP); Yukihiro Takeuchi, Akashi (JP); Keigo Mitsumori, Kobe (JP); Naoto Ebine, Akashi (JP)

(73) Assignee: FUJITSU LIMITED, Kawasaki (JP)

( * ) Notice: Subject to any disclaimer, the term of this patent is extended or adjusted under 35 U.S.C. 154(b) by 331 days.

(21) Appl. No.: 14/657,335

(22) Filed: Mar. 13, 2015

(65) Prior Publication Data

US 2015/0278287 A1 Oct. 1, 2015

(30) Foreign Application Priority Data

Mar. 31, 2014 (JP) .................. 2014-074723

(51) Int. Cl.
*G06F 11/00* (2006.01)
*G06F 17/30* (2006.01)
(Continued)

(52) U.S. Cl.
CPC ...... *G06F 17/30371* (2013.01); *G06F 11/079* (2013.01); *G06F 11/0751* (2013.01);
(Continued)

(58) Field of Classification Search
CPC .... G06F 11/0751; G06F 11/079; G06F 11/28; G06F 11/302; G06F 11/36; G06F 11/362;
(Continued)

(56) References Cited

U.S. PATENT DOCUMENTS

| | | | | |
|---|---|---|---|---|
| 2005/0015668 A1* | 1/2005 | Doyle | ............... | G06F 11/079 714/25 |
| 2009/0193429 A1* | 7/2009 | Clark | ............... | G06F 9/5027 719/313 |

(Continued)

FOREIGN PATENT DOCUMENTS

| | | |
|---|---|---|
| JP | 6-236350 | 8/1994 |
| JP | 2002-49493 | 2/2002 |

(Continued)

OTHER PUBLICATIONS

Japanese Office Action mailed Nov. 7, 2017 for corresponding Japanese Patent Application No. 2014-074723, with English Translation, 8 pages.

*Primary Examiner* — Joshua P Lottich
(74) *Attorney, Agent, or Firm* — Fujitsu Patent Center

(57) ABSTRACT

A process managing apparatus includes detecting an occurrence of an abnormality in a management target system that sequentially executes a plurality of process procedures; identifying a process procedure in which the abnormality has occurred from among the plurality of process procedures according to the detecting of the occurrence of the abnormality; identifying from among the plurality of process procedures a subsequent process procedure that is affected by the abnormality that occurred in the identified process procedure by referring to process procedure information that defines a plurality of operating processes included in the plurality of process procedures and an order of execution of the plurality of operating processes; and identifying output information that relates to the identified process procedure (Continued)

or the subsequent process procedure, among output information from the plurality of process procedures.

15 Claims, 29 Drawing Sheets

(51) Int. Cl.
*G06F 11/28* (2006.01)
*G06F 11/36* (2006.01)
*G06F 11/07* (2006.01)
*G06F 11/32* (2006.01)

(52) U.S. Cl.
CPC .............. *G06F 11/28* (2013.01); *G06F 11/32* (2013.01); *G06F 11/362* (2013.01); *G06F 17/30312* (2013.01); *G06F 17/30477* (2013.01)

(58) Field of Classification Search
CPC ......... G06F 17/30312; G06F 17/30371; G06F 17/30477
See application file for complete search history.

(56) References Cited

U.S. PATENT DOCUMENTS

| | | | | |
|---|---|---|---|---|
| 2010/0287416 | A1* | 11/2010 | Shacham | G06F 11/0709 714/39 |
| 2012/0151278 | A1* | 6/2012 | Tsantilis | G06F 11/366 714/48 |
| 2012/0210335 | A1* | 8/2012 | Salt | G06F 9/541 719/315 |
| 2013/0232192 | A1 | 9/2013 | Kawagata et al. | |
| 2014/0007119 | A1* | 1/2014 | Liu | G06F 9/54 718/102 |
| 2014/0229606 | A1* | 8/2014 | Griswold | H04L 41/069 709/224 |
| 2014/0379658 | A1* | 12/2014 | Cheriton | G06F 17/30371 707/639 |

FOREIGN PATENT DOCUMENTS

| | | |
|---|---|---|
| JP | 2011-141789 | 7/2011 |
| JP | 2013-182432 | 9/2013 |

* cited by examiner

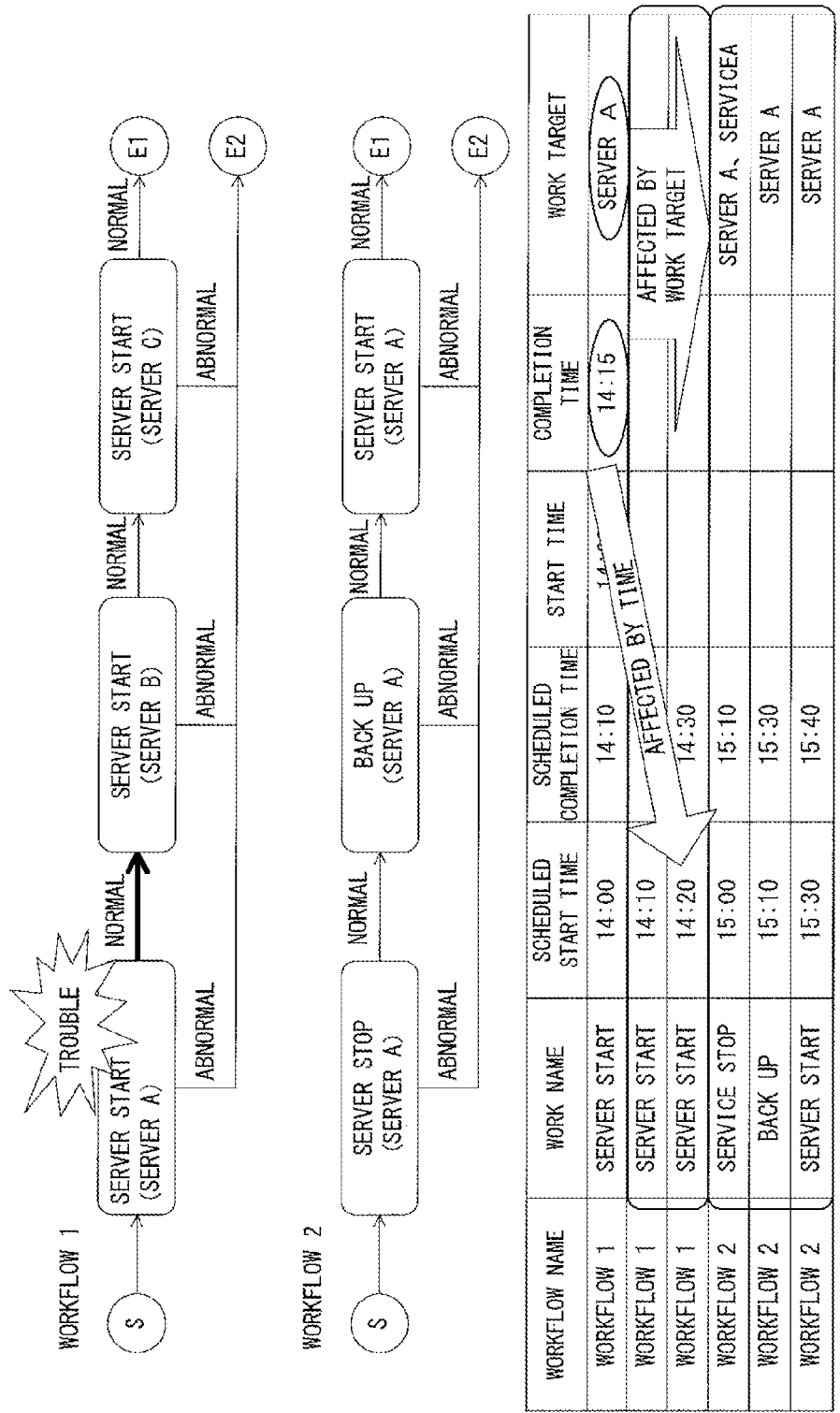
F I G. 1

| WORKFLOW NAME | WORK NAME | WORK TARGET | DETERMINATION KNOWLEDGE ID |
|---|---|---|---|
| WORKFLOW 1 | SERVER START | SERVER A | cid1, cid2, cid3 |
| WORKFLOW 1 | SERVER START | SERVER B | cid1, cid2, cid3 |
| WORKFLOW 1 | SERVER START | SERVER C | cid1, cid2, cid3 |
| WORKFLOW 3 | SERVICE STOP | SERVER B, SERVICE B | cid4 |
| WORKFLOW 3 | BACK UP | SERVER B | cid5 |
| WORKFLOW 3 | SERVER START | SERVER B, SERVICE B | cid6 |

WORKFLOW THAT USES SERVER A IS DETERMINED AS AFFECTED

| DETERMINATION KNOWLEDGE ID | EVALUATION ITEM | CONDITION | EVALUATION VALUE | USE FLAG (※) |
|---|---|---|---|---|
| cid1 | SERVER SETTING (CPU) | = | SERVER SETTING (CPU PRESENT) | 0 |
| cid2 | SERVER SETTING (MEMORY) | = | SERVER SETTING (MEMORY PRESENT) | 0 |
| cid3 | SERVER SETTING (CPU) | = | START AUTHORITY GIVEN | 0 |

NOT CORRESPONDING TO CONDITION OF cid1 AND WORKFLOW 1 IS DETERMINED AS AFFECTED

※ DETERMINED AS AFFECTED WHEN CORRESPONDING TO CONDITION(1)
DETERMINED AS NOT AFFECTED WHEN CORRESPONDING TO CONDITION(0)

⎯⎯⎯ : INFORMATION MANAGEMENT BY THIRD TECHNIQUE
----- : INFORMATION MANAGEMENT BY SECOND TECHNIQUE

F I G. 4

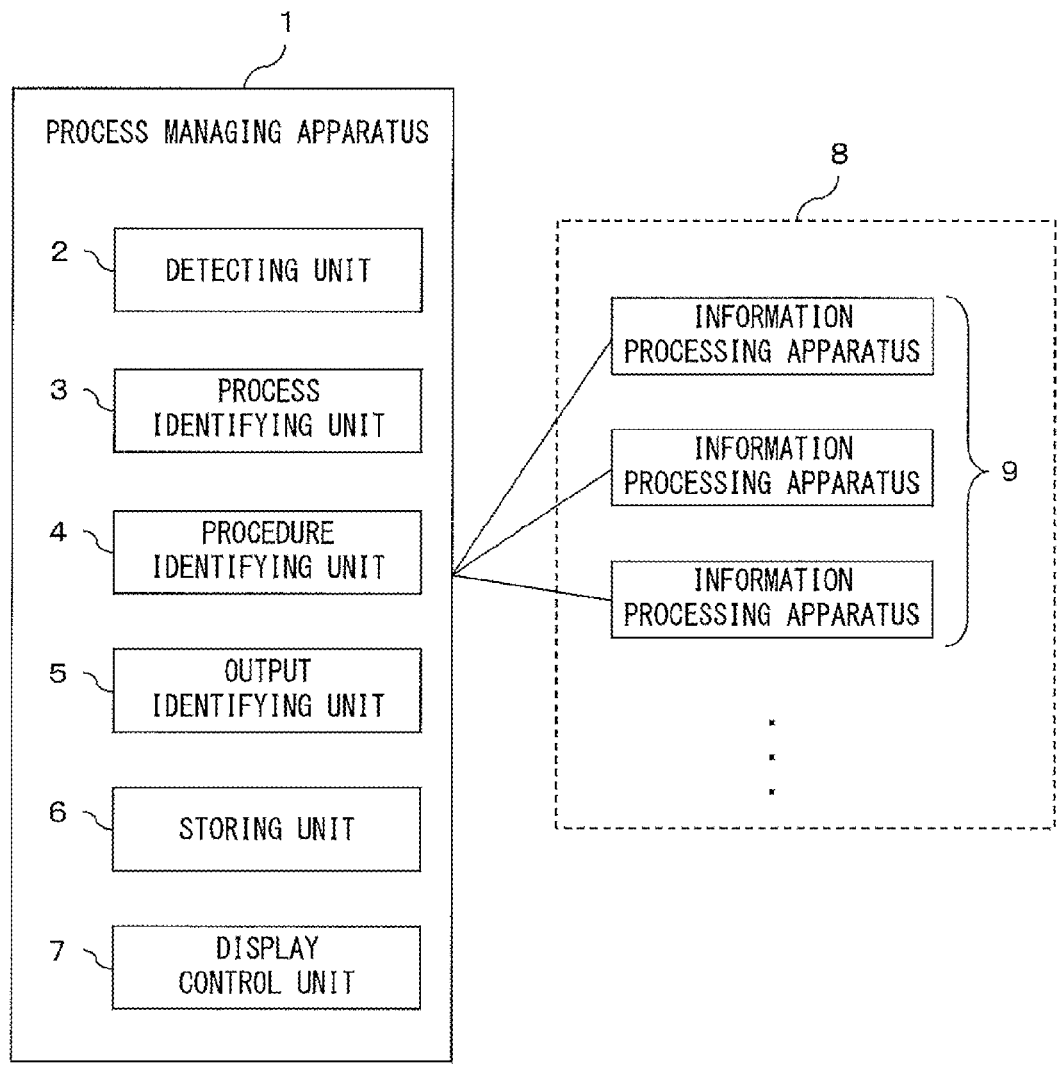
F I G. 7

| PROCESS DEFINITION NAME 19-1 | NODE NAME 19-2 | OPERATION CONTROL COMPONENT NAME 19-3 | NODE ID 19-4 | NODE TYPE 19-5 | ARROW NAME 19-6 | TRANSITION DESTINATION 19-7 |
|---|---|---|---|---|---|---|
| WORKFLOW 1 | SERVER START(A) | SERVER START | nid1 | NODE | NORMAL | nid2 |
| WORKFLOW 1 | SERVER START(A) | SERVER START | nid1 | NODE | ABNORMAL | e2 |
| WORKFLOW 1 | SERVER START(B) | SERVER START | nid2 | NODE | NORMAL | nid3 |
| WORKFLOW 1 | SERVER START(B) | SERVER START | nid2 | NODE | ABNORMAL | e2 |
| WORKFLOW 1 | SERVER START(C) | SERVER START | nid3 | NODE | NORMAL | e1 |
| WORKFLOW 1 | SERVER START(C) | SERVER START | nid3 | NODE | ABNORMAL | e2 |
| WORKFLOW 1 | NORMAL END | | e1 | END (NORMAL) | — | — |
| WORKFLOW 1 | ABNORMAL END | | e2 | END (ABNORMAL) | — | — |
| WORKFLOW 2 | SERVICE STOP | SERVICE STOP | nid4 | NODE | NORMAL | nid5 |
| WORKFLOW 2 | SERVICE STOP | SERVICE STOP | nid4 | NODE | ABNORMAL | e4 |
| WORKFLOW 2 | BACK UP | COMMAND EXECUTION | nid5 | NODE | NORMAL | nid6 |
| WORKFLOW 2 | BACK UP | COMMAND EXECUTION | nid5 | NODE | ABNORMAL | e4 |
| WORKFLOW 2 | SERVICE START | SERVICE START | nid6 | NODE | NORMAL | e3 |
| WORKFLOW 2 | SERVICE START | SERVICE START | nid6 | NODE | ABNORMAL | e4 |
| WORKFLOW 2 | NORMAL END | | e3 | END (NORMAL) | — | — |
| WORKFLOW 2 | ABNORMAL END | | e4 | END (ABNORMAL) | — | — |
| WORKFLOW 3 | SERVICE STOP | SERVICE STOP | nid7 | NODE | NORMAL | nid8 |
| WORKFLOW 3 | SERVICE STOP | SERVICE STOP | nid7 | NODE | ABNORMAL | e6 |
| WORKFLOW 3 | BACK UP | COMMAND EXECUTION | nid8 | NODE | NORMAL | nid9 |
| WORKFLOW 3 | BACK UP | COMMAND EXECUTION | nid8 | NODE | ABNORMAL | e6 |
| WORKFLOW 3 | SERVICE START | SERVICE START | nid9 | NODE | NORMAL | e5 |
| WORKFLOW 3 | SERVICE START | SERVICE START | nid9 | NODE | ABNORMAL | e6 |
| WORKFLOW 3 | NORMAL END | | e5 | END (NORMAL) | — | — |
| WORKFLOW 3 | ABNORMAL END | | e6 | END (ABNORMAL) | — | — |

FIG. 11

| NODE NAME | AFFECTED WORK |
|---|---|
| SERVER START | SERVER STOP<br>SERVER START<br>SERVICE START<br>SERVICE STOP<br>BACK UP |
| SERVICE STOP | SERVER STOP<br>SERVER START<br>SERVICE START<br>SERVICE STOP<br>BACK UP |
| BACK UP | SERVER STOP<br>SERVER START<br>BACK UP |
| ... | ... |

F I G. 1 2

| | 21-1 | 21-2 | 21-3 | 21-4 | 21-5 | 21-6 |
|---|---|---|---|---|---|---|
| | PROCESS DEFINITION NAME | NODE NAME | WORK START TIME | WORK END TIME | AFFECTED WORK | WORK TARGET |
| | WORKFLOW 1 | SERVER START | 14:00 | 14:10 | SERVER STOP SERVER START SERVICE START SERVICE STOP BACK UP | SERVER A |
| | WORKFLOW 1 | SERVER START | 14:10 | 14:20 | SERVER STOP SERVER START SERVICE START SERVICE STOP BACK UP | SERVER B |
| | WORKFLOW 1 | SERVER START | 14:20 | 14:30 | SERVER STOP SERVER START SERVICE START SERVICE STOP BACK UP | SERVER C |
| | WORKFLOW 3 | SERVICE STOP | 13:00 | 13:10 | SERVER STOP SERVER START SERVICE START SERVICE STOP BACK UP | SERVER B SERVICE B |
| | WORKFLOW 3 | BACK UP | 13:10 | 13:40 | SERVER STOP SERVER START BACK UP | SERVER B |
| | WORKFLOW 3 | SERVICE START | 13:40 | 13:50 | SERVER STOP SERVER START SERVICE START SERVICE STOP BACK UP | SERVER B SERVICE B |

FIG. 13

| OPERATION CONTROL COMPONENT NAME 22-1 | CONTROL TARGET 22-2 | DIRECT CAUSE OF ABNORMALITY 22-3 | RESULT 22-4 | CHECK MEANS 22-5 | ABNORMAL VALUE 22-6 | ARROW NAME 22-7 | CLASSIFICATION 22-8 |
|---|---|---|---|---|---|---|---|
| START VIRTUAL SERVER | | INPUT PARAMETER ERROR | ERROR STATE | | | - | INPUT PARAMETER |
| | SEVER | SERVER NAME DOES NOT EXIST | ABNORMAL | OBTAIN VIRTUAL MACHINE NAME | NO MACHINE NAME | FAIL | SERVER |
| | | NAME NOT RESOLVED | ABNORMAL | PING RESPONSE VALUE TO DNS SERVER | 4 SECONDS OR MORE | FAIL | DNS |
| | | HIGH LOAD | ERROR STATE | | | - | COMPLETION TIME OVER |
| | | VIRTUAL MACHINE STATE UNKNOWN | NORMAL | OBTAIN VIRTUAL MACHINE STATE | UNKNOWN | SUCCESS | SERVER |
| | | SETTING NOT READY TO START VIRTUAL MACHINE (NO CPU, ETC.) | ABNORMAL | VIRTUAL MACHINE SETTING INFORMATION | SETTING ERROR | FAIL | VIRTUAL MACHINE |
| | | AUTHENTICATION ERROR | ABNORMAL | AUTHENTICATION INFORMATION OF VIRTUAL ENVIRONMENT MANAGEMENT SERVER | USER NAME ERROR PASSWORD ERROR AUTHENTICATION SERVICE NOT STARTED | FAIL | NETWORK |
| | | CONNECTION ERROR | ABNORMAL | PING RESPONSE VALUE OF VIRTUAL ENVIRONMENT MANAGEMENT SERVER | 4 SECONDS OR MORE | FAIL | NETWORK |
| | | INSUFFICIENT MEMORY | ABNORMAL | FREE MEMORY INFORMATION OF VIRTUAL ENVIRONMENT MANAGEMENT SERVER | 2GByte OR LESS | FAIL | MEMORY |
| | | INSUFFICIENT DISK AREA | ABNORMAL | FREE DISK INFORMATION OF VIRTUAL ENVIRONMENT MANAGEMENT SERVER | 2GByte OR LESS | FAIL | DISK |
| | | NETWORK DISCONNECTED | ABNORMAL | PING RESPONSE VALUE OF VIRTUAL ENVIRONMENT MANAGEMENT SERVER | 4 SECONDS OR MORE | FAIL | NETWORK |

| 22-1 OPERATION CONTROL COMPONENT NAME | 22-2 CONTROL TARGET | 22-3 DIRECT CAUSE OF ABNORMALITY | 22-4 RESULT | 22-5 CHECK MEANS | 22-6 ABNORMAL VALUE | 22-7 ARROW NAME | 22-8 CLASSIFICATION |
|---|---|---|---|---|---|---|---|
| STOP SERVICE | SERVER | INPUT PARAMETER ERROR | ERROR STATE | | | - | INPUT PARAMETER |
| | | SERVER STOPPED | ABNORMAL | PING RESPONSE VALUE OF MANAGEMENT TARGET SERVER | 4 SECONDS OR MORE | FAIL | SERVER |
| | | NAME NOT RESOLVED | ABNORMAL | PING RESPONSE VALUE TO DNS SERVER | 4 SECONDS OR MORE | FAIL | DNS |
| | | SERVER STOPPED | ABNORMAL | MANAGEMENT TARGET SERVER STATE | OTHER THAN START | FAIL | SERVER |
| | | SERVICE NAME DOES NOT EXIST | ABNORMAL | PRESENCE/ABSENCE OF SERVICE OF MANAGEMENT TARGET SERVER | SERVICE DOES NOT EXIST | FAIL | SERVICE |
| | | SERVICE STATE UNKNOWN | ABNORMAL | SERVICE STATE OF MANAGEMENT TARGET SERVER | UNKNOWN | FAIL | SERVICE |
| | | AUTHENTICATION ERROR | ABNORMAL | AUTHENTICATION INFORMATION OF MANAGEMENT TARGET SERVER | user/pass/admin | FAIL | SERVICE |
| | | CONNECTION ERROR | ABNORMAL | PING RESPONSE VALUE OF MANAGEMENT TARGET SERVER | 4 SECONDS OR MORE | FAIL | NETWORK |
| | | HIGH LOAD | ERROR STATE | | | | COMPLETION TIME OVER |
| | | INSUFFICIENT MEMORY | ABNORMAL | FREE MEMORY INFORMATION OF MANAGEMENT TARGET SERVER | 10GByte OR LESS | FAIL | MEMORY |
| | | INSUFFICIENT DISK AREA | ABNORMAL | FREE DISK INFORMATION OF MANAGEMENT TARGET SERVER | 1MByte OR LESS | FAIL | DISK |
| | | NETWORK DISCONNECTED | ABNORMAL | PING RESPONSE VALUE OF MANAGEMENT TARGET SERVER | 4 SECONDS OR MORE | FAIL | NETWORK |

| PROCESS DEFINITION NAME | NODE NAME | WORK TARGET | NODE ID | CHECK MEANS | EXECUTION RESULT |
|---|---|---|---|---|---|
| WORKFLOW 1 | SERVER START | SERVER A | nid1 | OBTAIN VIRTUAL MACHINE NAME | SERVER A |
| WORKFLOW 1 | SERVER START | SERVER A | nid1 | PING RESPONSE VALUE OF DNA SERVER | 0.04s |
| WORKFLOW 1 | SERVER START | SERVER A | nid1 | OBTAIN VIRTUAL MACHINE STATE | STOPPED STATE |
| WORKFLOW 1 | SERVER START | SERVER A | nid1 | OBTAIN VIRTUAL MACHINE SETTING INFORMATION | CPU:NONE MEM:4GB NIC:2 |
| WORKFLOW 1 | SERVER START | SERVER A | nid1 | AUTHENTICATION INFORMATION OF VIRTUAL ENVIRONMENT MANAGEMENT SERVER | user/pass/ PowerUser |
| WORKFLOW 1 | SERVER START | SERVER A | nid1 | PING RESPONSE VALUE OF VIRTUAL ENVIRONMENT MANAGEMENT SERVER | 0.02s |
| WORKFLOW 1 | SERVER START | SERVER A | nid1 | FREE MEMORY INFORMATION OF VIRTUAL ENVIRONMENT MANAGEMENT SERVER | 80GB |
| WORKFLOW 1 | SERVER START | SERVER A | nid1 | FREE DISK INFORMATION OF VIRTUAL ENVIRONMENT MANAGEMENT SERVER | 20TB |
| WORKFLOW 2 | SERVICE STOP | SERVER A | nid4 | PING RESPONSE OF MANAGEMENT TARGET SERVER | NO RESPONSE |
| WORKFLOW 2 | SERVICE STOP | SERVER A | nid4 | PING RESPONSE VALUE TO DNS SERVER | 004s |
| WORKFLOW 2 | SERVICE STOP | SERVER A | nid4 | MANAGEMENT SERVER STATE | STOPPED STATE |
| WORKFLOW 2 | SERVICE STOP | SERVER A | nid4 | AUTHENTICATION INFORMATION OF VIRTUAL ENVIRONMENT MANAGEMENT SERVER | — |
| WORKFLOW 2 | SERVICE STOP | SERVER A | nid4 | FREE MEMORY INFORMATION OF MANAGEMENT TARGET SERVER | — |
| WORKFLOW 2 | SERVICE STOP | SERVER A | nid4 | FREE DISK INFORMATION OF MANAGEMENT TARGET SERVERR | — |
| WORKFLOW 2 | SERVICE STOP | SERVER A | nid4 | PRESENCE/ABSENCE OF SERVICE OF MANAGEMENT TARGET SERVER | — |
| WORKFLOW 2 | SERVICE STOP | SERVER A | nid4 | SERVICE STATE OF MANAGEMENT TARGET SERVER | — |
| WORKFLOW 3 | SERVICE STOP | SERVER B | nid7 | PING RESPONSE OF MANAGEMENT TARGET SERVER | NO RESPONSE |
| WORKFLOW 3 | SERVICE STOP | SERVER B | nid7 | PING RESPONSE VALUE TO DNS SERVER | 0.04s |
| WORKFLOW 3 | SERVICE STOP | SERVER B | nid7 | MANAGEMENT SERVER STATE | STOPPED STATE |
| WORKFLOW 3 | SERVICE STOP | SERVER B | nid7 | AUTHENTICATION INFORMATION OF MANAGEMENT TARGET SERVER | — |
| WORKFLOW 3 | SERVICE STOP | SERVER B | nid7 | FREE MEMORY INFORMATION OF MANAGEMENT TARGET SERVER | — |
| WORKFLOW 3 | SERVICE STOP | SERVER B | nid7 | FREE DISK INFORMATION OF MANAGEMENT TARGET SERVER | — |
| WORKFLOW 3 | SERVICE STOP | SERVER B | nid7 | PRESENCE/ABSENCE OF SERVICE OF MANAGEMENT TARGET SERVER | — |
| WORKFLOW 3 | SERVICE STOP | SERVER B | nid7 | SERVICE STATE OF MANAGEMENT TARGET SERVER | — |

FIG. 15

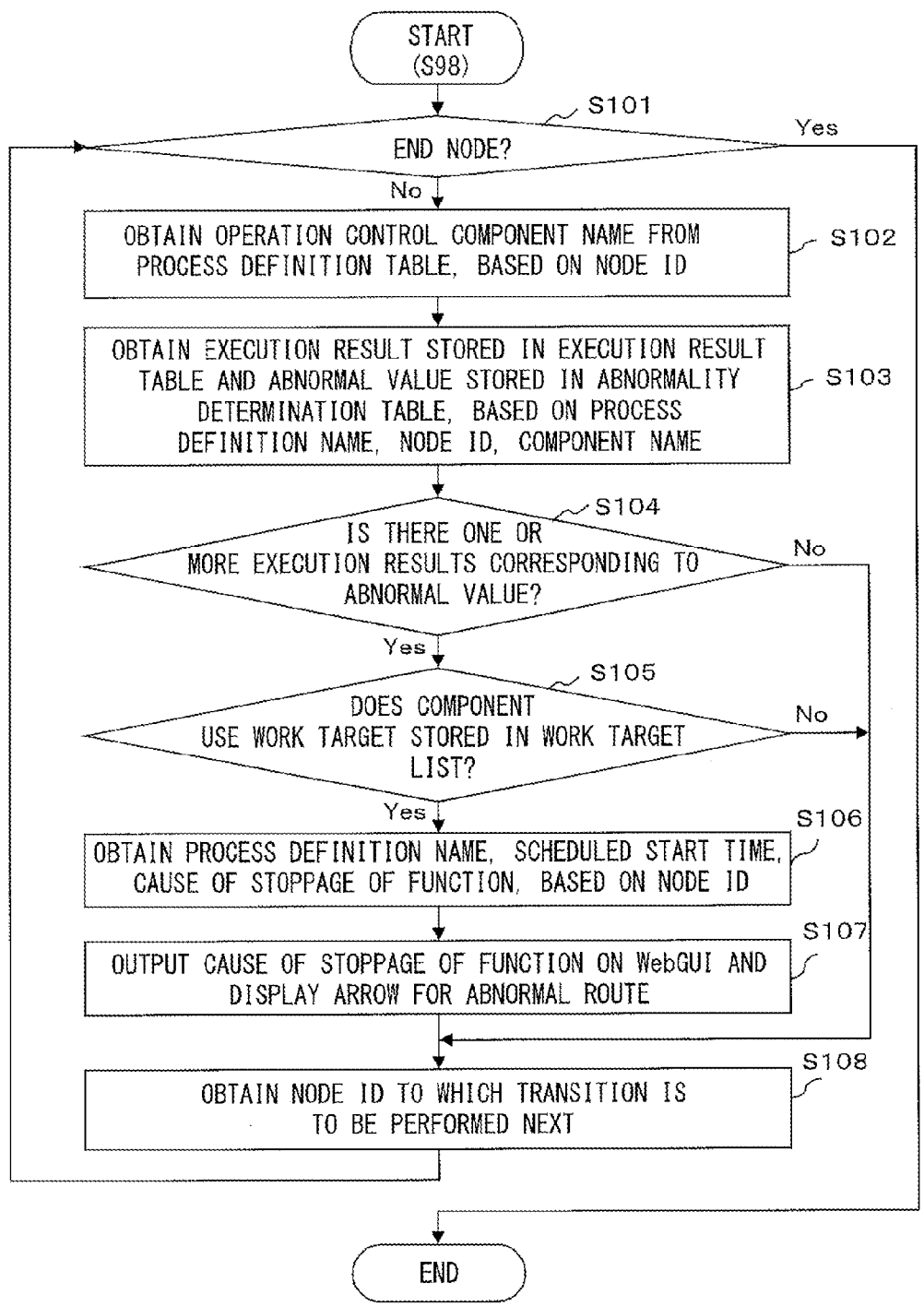
F I G. 2 4

| PROCESS DEFINITION NAME | NODE NAME | WORK TARGET | CHECK MEANS | EXECUTION RESULT | ABNORMAL VALUE |
|---|---|---|---|---|---|
| WORKFLOW 1 | SERVER START | SERVER A | OBTAIN VIRTUAL MACHINE NAME | SERVER A | NO MACHINE NAME |
| | | | PING RESPONSE VALUE OF DNS SERVER | 0.04 s | 4 SECONDS OR MORE |
| | | | OBTAIN VIRTUAL MACHINE STATE | STOPPED STATE | UNKNOWN |
| | | | OBTAIN VIRTUAL MACHINE SETTING INFORMATION | CPU : NONE<br>MEM : 4GB<br>NIC : 2 | CPU : NONE<br>MEM : NONE<br>NIC : NONE |
| | | | AUTHENTICATION INFORMATION OF VIRTUAL ENVIRONMENT MANAGEMENT SERVER | user/pass/PowerUser | user/pass/PowerUser |
| | | | ping RESPONSE VALUE OF VIRTUAL ENVIRONMENT MANAGEMENT SERVER | | 4 SECONDS OR MORE |
| | | | FREE MEMORY INFORMATION OF VIRTUAL ENVIRONMENT MANAGEMENT SERVER | | |
| | | | FREE DISK INFORMATION OF VIRTUAL ENVIRONMENT MANAGEMENT SERVER | 20 TB | 2GByte OR LESS |
| WORKFLOW 1 WORKFLOW 4 | SERVER START | SERVER B | OBTAIN VIRTUAL MACHINE NAME | SERVER C | NO MACHINE NAME |
| | | | PING RESPONSE VALUE OF DNS SERVER | 0.04 s | UNKNOWN |
| | | | OBTAIN VIRTUAL MACHINE STATE | STOPPED STATE | UNKNOWN |
| | | | OBTAIN VIRTUAL MACHINE SETTING INFORMATION | CPU : 1 (WITH HT)<br>MEM : 4GB<br>NIC : 2 | CPU : NONE<br>MEM : NONE<br>NIC : NONE |
| | | | AUTHENTICATION INFORMATION OF VIRTUAL ENVIRONMENT MANAGEMENT SERVER | user/pass/PowerUser | user/pass/PowerUser |
| | | | PING RESPONSE VALUE OF VIRTUAL ENVIRONMENT MANAGEMENT SERVER | 0.02 s | 4 SECONDS OR MORE |
| | | | FREE MEMORY INFORMATION OF VIRTUAL ENVIRONMENT MANAGEMENT SERVER | 80GB | 2GByte OR LESS |
| | | | FREE DISK INFORMATION OF VIRTUAL ENVIRONMENT MANAGEMENT SERVER | 20 TB | 2GByte OR LESS |

F I G. 25

| PROCESS DEFINITION NAME | NODE NAME | WORK TARGET | CHECK MEANS | EXECUTION RESULT | ABNORMAL VALUE |
|---|---|---|---|---|---|
| WORKFLOW 3 | SERVICE STOP | SERVER B | PING RESPONSE OF TARGET SERVER | NO RESPONSE | 4 SECONDS OR MORE |
| | | | PING RESPONSE VALUE TO DNS SERVER | 0.04S | 4 SECONDS OR MORE |
| | | | TARGET SERVER STATE | STOPPED STATE | OTHER THAN START |
| | | | AUTHENTICATION INFORMATION OF VIRTUAL ENVIRONMENT MANAGEMENT SERVER | — | user/pass/Admin |
| | | | FREE MEMORY INFORMATION OF TARGET SERVER | — | 2GByte |
| | | | FREE DISK INFORMATION OF TARGET SERVER | — | 2GByte |
| | | | PRESENCE/ABSENCE OF SERVICE OF TARGET SERVER | — | |
| | | | SERVICE STATE OF TARGET SERVE | — | |
| WORKFLOW 2 | SERVICE STOP | SERVER A | PING RESPONSE OF TARGET SERVER | NO RESPONSE | 4 SECONDS OR MORE |
| | | | PING RESPONSE VALUE TO DNS SERVER | 0.04S | 4 SECONDS OR MORE |
| | | | TARGET SERVER STATE | STOPPED STATE | OTHER THAN START |
| | | | AUTHENTICATION INFORMATION OF VIRTUAL ENVIRONMENT MANAGEMENT SERVER | — | — |
| | | | FREE MEMORY INFORMATION OF TARGET SERVER | — | — |
| | | | FREE DISK INFORMATION OF TARGET SERVER | — | — |
| | | | PRESENCE/ABSENCE OF SERVICE OF TARGET SERVER | — | — |
| | | | SERVICE STATE OF TARGET SERVE | — | — |

FIG. 26

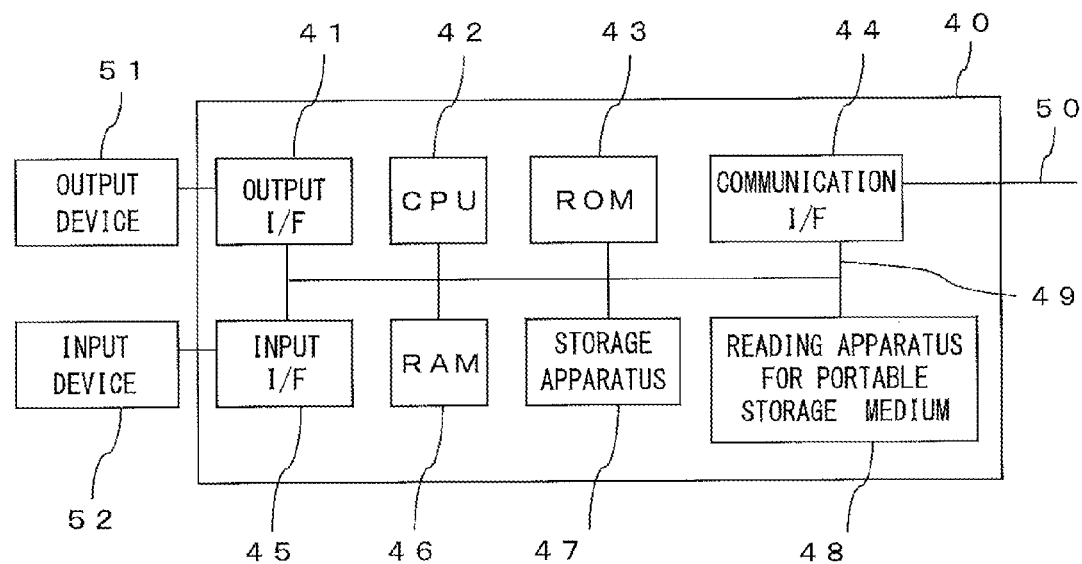
F I G. 2 8

RECORDING MEDIUM HAVING STORED THEREIN PROCESS MANAGING PROGRAM, PROCESS MANAGING APPARATUS AND PROCESS MANAGING METHOD

CROSS-REFERENCE TO RELATED APPLICATIONS

This application is based upon and claims the benefit of priority of the prior Japanese Patent Application No. 2014-074723, filed on Mar. 31, 2014, the entire contents of which are incorporated herein by reference.

FIELD

The embodiments described herein relate to management of processes executed in an information processing apparatus.

BACKGROUND

In information technology (IT) systems in companies and data centers, software for automation of operation management (Run Book Automation) has been used for automation of power management for servers or the like, in order to reduce management works. In regard to such operation management automation, there are following techniques, for example.

As a first technique, there is a technique for visualizing and outputting dependency, inconsistency and risks between individual works in a plurality of operation works with a mix of human-related works and machine-related works, so as to perform appropriate management (for example, Patent document 1). With the first technique, a system which includes an input unit, a work time decision unit, a process definition generation unit, an extraction unit, and an output information generation unit is described. The input unit accepts information of operation works which includes a plurality of works including works for machines and works for humans and the order of the plurality of works. The work time decision unit decides the work time required for each of the plurality of works based on the time decision rule. The process definition generation unit generates a plurality of process definitions in which each decided work time is associated with the corresponding work for machines or work for human, and makes it included in the information of operation works. The extraction unit extracts dependency and/or risk between the respective works of the plurality of works based on the plurality of process definitions and the analysis rule. The output information generation unit generates output information for outputting the dependency and/or the risk in a visible manner.

Meanwhile, as a second technique, there is a technique related to generation of program control information that is flexible and easy to reuse (for example, Patent document 2). In the second technique, a work flow control information generation step, a program cooperation information generation step, and a system configuration information generation step are separated to make reuse and configuration changes easy, and further, pieces of definition information obtained from each are stored in a repository and managed in an integrated manner, to obtain information from the relationship between the pieces of definition information.

Meanwhile, as a third technique, there is a technique with which works that are affected when a failure occurs in a service are judged in a system that uses service Oriented Architecture (SOA) (for example, Patent document 3). In the third technique, configuration information and determination knowledge indicate the condition of execution of a service executed in works. A service operation management server apparatus inputs an execution log that represents the service execution situation from an Enterprise Service Bus (ESB) server apparatus. When the service operation management server apparatus determines that a failure has occurred in a service as a result of analysis of an execution log 1031, the service operation management servicer apparatus judges, for each work, whether or not the situation at the time of occurrence of the failure corresponds to the condition of execution. For a work that does not correspond to the condition of execution, there is no possibility that the service was being executed, and it is judged that the failure does not affect the work. For a work that corresponds to the condition of execution, there is a possibility that the service was being executed, and it is judged that the failure affects the work.

Patent document 1: Japanese Laid-open Patent Publication No. 2013-182432
Patent document 2: Japanese Laid-open Patent Publication No. 2002-049493
Patent document 3: Japanese Laid-open Patent Publication No. 2011-141789
Patent document 4: Japanese Laid-open Patent Publication No. 6-236350

SUMMARY

A non-transitory computer-readable recording medium stores a process managing program for causing a computer to execute a managing process. The managing process includes detecting an occurrence of an abnormality in a management target system that sequentially executes a plurality of process procedures; identifying a process procedure in which the abnormality has occurred from among the plurality of process procedures according to the detecting of the occurrence of the abnormality; identifying from among the plurality of process procedures a subsequent process procedure that is affected by the abnormality that occurred in the identified process procedure by referring to process procedure information that defines a plurality of operating processes included in the plurality of process procedures and an order of execution of the plurality of operating processes; and identifying output information that relates to the identified process procedure or the subsequent process procedure, among output information from the plurality of process procedures.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a diagram (1) for explaining an instance solved with the first technique.

FIG. 4 is a diagram for explaining an instance that is impossible to solve even with a combination of the second and third techniques;

FIG. 7 illustrates an example of a process managing apparatus in the embodiment;

FIG. 11 illustrates an example of a process definition table in the embodiment;

FIG. 12 illustrates an example of an affected range list in the embodiment;

FIG. 13 illustrates an example of a WF management table in the embodiment;

FIG. 14A illustrates an example (1) of an abnormality determination table in the embodiment;

FIG. 14B illustrates an example (2) of an abnormality determination table in the embodiment;

FIG. 15 illustrates an example of an execution result table in the embodiment;

FIG. 24 is a flowchart illustrating the detailed process in S98;

FIG. 25 is a diagram for explaining evaluation of an execution result with a check means in regard to nodes on a workflow in which a trouble has occurred in the embodiment;

FIG. 26 is a diagram for explaining evaluation or an execution result with a check means in regard to a node on a workflow other than a work flow in which a trouble has occurred in the embodiment;

FIG. 28 is an example of a configuration block diagram of the hardware environment of a computer that executes a program in an example in the embodiment.

DESCRIPTION OF EMBODIMENTS

In management operation for information processing apparatuses, in order to cope with the cloud era, operation management of data centers are performed by creating a process definition (workflow) so that one or more information processing apparatuses sequentially execute processes to automate the operation management work. When a currently-running workflow affects a subsequent workflow that is scheduled to be run later, making it unable to run in a normal manner, the operation management administrator needs to handle it promptly so as to perform normal operation. For example, in some cases, it is required to determine whether it is necessary to stop the currently-running workflow, or whether it is necessary to postpone execution of a workflow that is scheduled to be run later. For that purpose, it is necessary to understand the influence of the currently-running workflow on other workflows.

As an aspect, the embodiment provides a technique for identifying a workflow that is scheduled to be run and that is affected by an abnormality that has occurred in another workflow.

When an operation work of a data center is described as a workflow and a plurality of workflows run, an influence of a preceding workflow on a subsequent workflow may make it impossible for the subsequent workflow to be terminated in a normal manner. For example, a failure in the starting work for a management-target service may cause a service starting work on the management-target server described in another workflow to fail.

In order to automatically manage such dependency between works in workflows and to visualize the mutual influence, for example, in the first technique, management of information that affects works on a workflow is performed. For example, it is assumed that there is a system configuration in which servers A, B, and C exist. Servers A, B, and C perform the works on a workflow by operating servers A, B, and C. A scheduled start time and a scheduled completion time is set for each work on the workflows for schedule management.

According to the first technique, as illustrated in FIG. 1, when a trouble occurs while an instruction for server stop is issued to the server A in Workflow 1 and the work completion time exceeds the scheduled work completion time, the system detects the time overrun and starts analysis of other works that are affected. At this time, when the work start time is delayed, subsequent works on Workflow 1 are affected (works affected by time).

In addition, in the respective works on a workflow (Workflow 2) that has not been started, the work target (Server A) at the time of occurrence of the trouble is the same. Therefore, the works may not be terminated in a normal manner due to the occurrence of the trouble, and it is detected that the works are affected (works affected by the work target).

Figure 2:
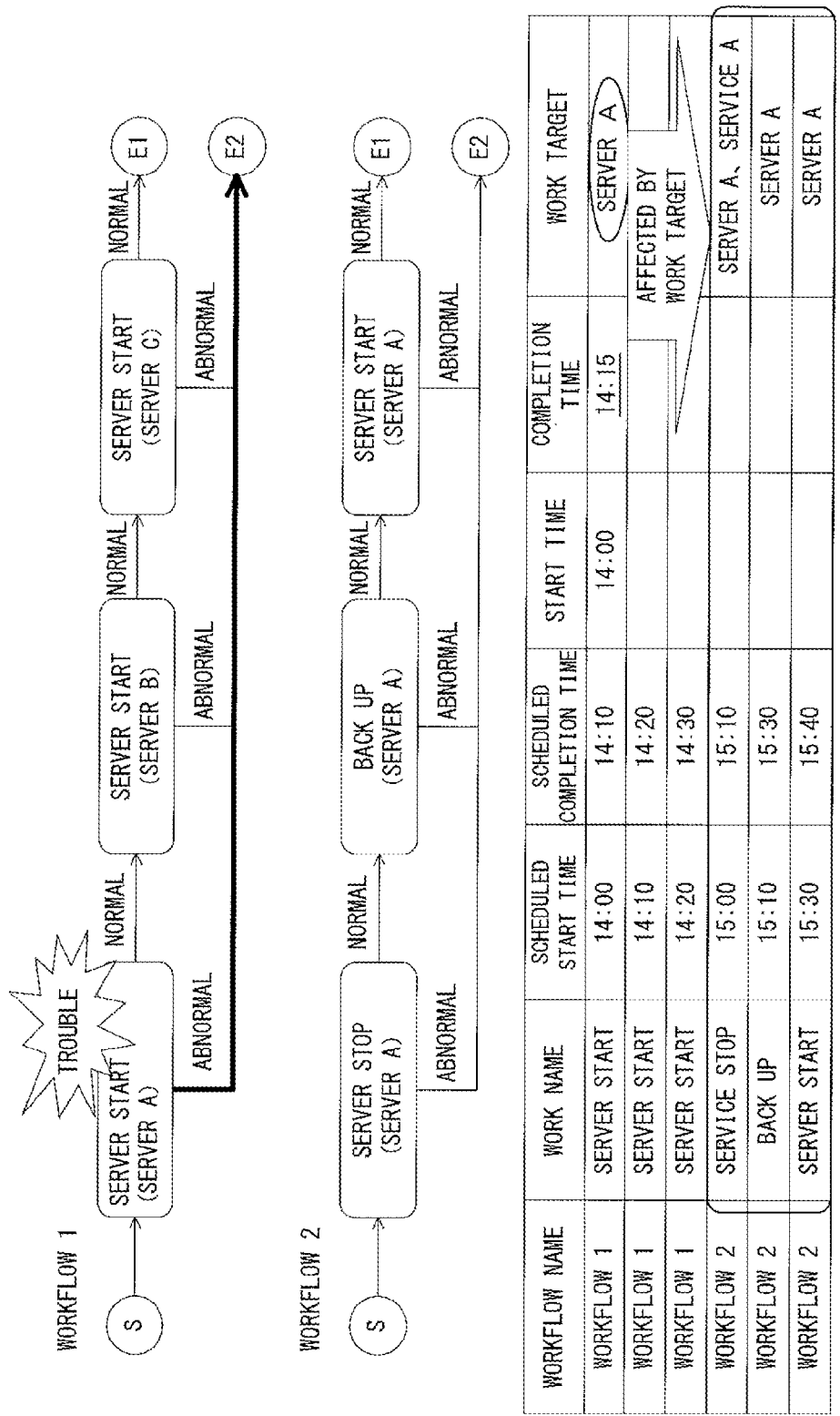
FIG. 2 is a diagram (2) for explaining an instance solved with the first technique.

Meanwhile, the above is a case of proceeding to the normal route even with the occurrence of the trouble, but in a usual case, the process proceeds to an abnormal route when a trouble occurs, as illustrated in FIG. 2. In that case, works for Server and Server C in Workflow 1 are not performed, and therefore, it is determined that there are no influences on the works, according to the first technique. However, the work target of the work in which the trouble occurred is Server A, and therefore, it is detected that Server A in the workflow (Workflow 2) that has not been started is affected.

Figure 3:
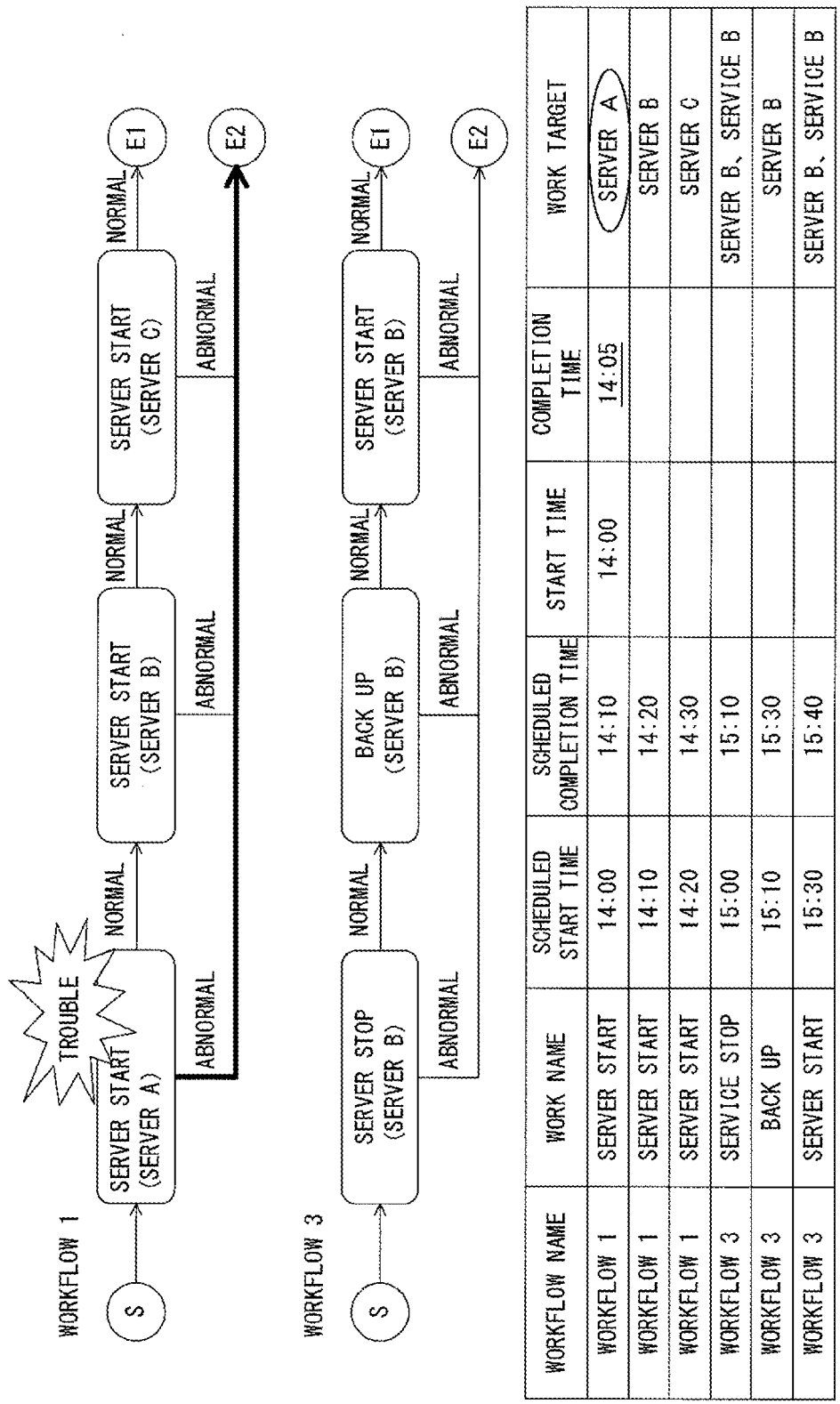
FIG. 3 is a diagram for explaining an instance that is impossible to solve with the first technique.

Next, an instance that is not solved with the first technique is explained using Workflow 1 and Workflow 3, as illustrated in FIG. 3. A case is assumed in which, in an instance in which a flow (Workflow 3) with automated works for Server B exists, a trouble occurs when server start is executed for Server A in Workflow 1, and works are completed before the scheduled completion time and the process proceeds to an abnormal route. In that case, works for Server B and Server C in Workflow 1 are not performed, and therefore, it is determined that the works are not affected, according to the first technique.

Workflow 3 that has not been started and in which the work-target server is only Server B is not affected by time and the work-target server is different from the work-target server in which a trouble occurred, and therefore, it is determined that Workflow 3 is not affected.

However, server start for Server B has not been performed in Workflow 1, and therefore, if Workflow 3 starts, there is a possibility that the service stop work for Server B fails, causing an abnormality.

As described above, a problem is left when it is impossible to detect the influence on Workflow 3 when Workflow 1 does not run in a normal manner.

Next, in the second technique, definition information is divided into tables in three divided steps to enable reuse for the system design of another computer. In the definition information, definition is made by associating a business process (work flow) and a program. When a trouble occurs, the defined information is used to derive the work name and the work flow name that are working in the computer on which the program is running, and to illustrate the occurrence of the failure on the work flow.

However, the presence of the influence is determined by obtaining only the works running on the computer on which the trouble occurred, and a problem is left wherein it the influence on other flows from works that are not executed due to the trouble is unknown.

Meanwhile, in the third technique, in regard to whether or not a service (work) in which a failure has occurred affects other works (workflows), the degree of influence and the affected range are determined by a determination table. However, the determination is made only about the influence on a workflow with the work in which the trouble has occurred as an origin, and therefore, a problem is left wherein the influence on other flows from works that are not executed due to the trouble is unknown.

In addition, there is the following problem even when the techniques of the second technique and the third technique are combined. In FIG. 4, when a failure occurs in Server A (startup fails because the central processing unit (CPU) is not set in the virtual server), a determination formula in regard to whether Workflow 1 affects works is executed using the determination knowledge ID, using the third technique. Accordingly, whether Workflow 1 affects works is determined. This case does not correspond to the determination condition because the CPU is not set and the use flag turns to 1, and therefore, it is determined that there is an influence. However, the determination of the presence of the influence is only about Workflow 1, and there is no mechanism to determine the influence on Workflow 3, and it is determined that Workflow 3 is not affected.

Meanwhile, influences on other workflows that uses the same work target are checked using the second technique, but it is determined again that Workflow 3 is not affected, because Workflow 3 does not use the work target in which the trouble has occurred.

As a method for identifying a workflow related to the workflow in which an abnormality has occurred using techniques described above, a method may be considered in which work targets that have an influence are management and other workflows that use all the work targets of the workflow in which the abnormality has occurred are obtained. Accordingly, it is possible to detect which workflow is affected by works on the normal route that is not taken due to the occurrence of the trouble.

Figure 5:
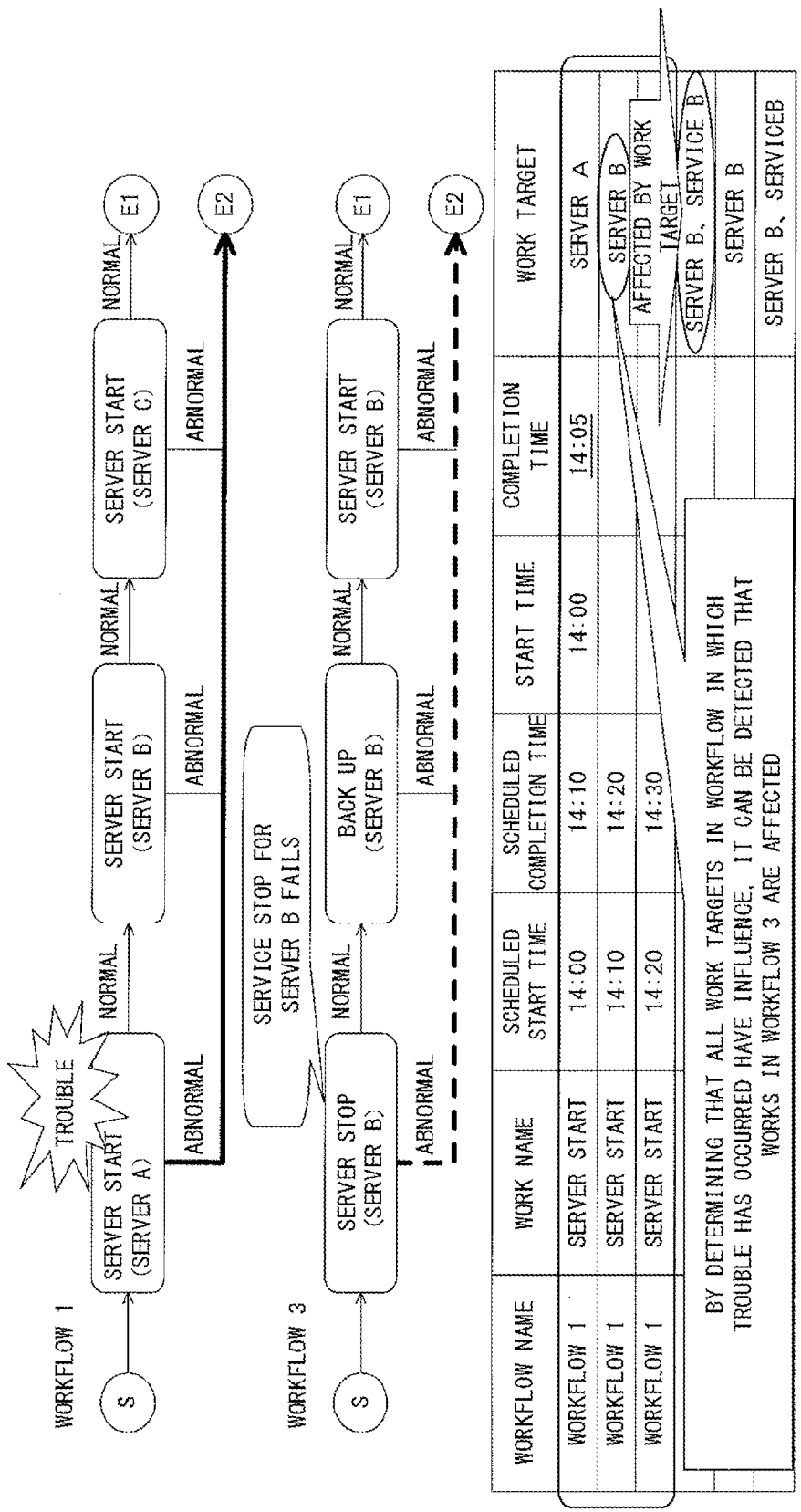
FIG. 5 is a diagram for explaining a technique (the fourth technique) to which a method is applied to determine, other work flows that uses all of the work targets of a work flow in which an abnormality has occurred are affected by the abnormality.

For example, as illustrated in FIG. 5, a case is considered in which a method in which it is determined that other workflows that uses all the work targets of a workflow in which an abnormality has occurred are affected. In this case, the service stop in Workflow 3 fails due to the influence of a trouble in Workflow 1. Therefore, by regarding all the work targets on Workflow 1 as work targets that have an influence, the trouble and the work target (Server B) in Workflow 3 are related, and it is determined that works in Workflow 3 are also affected. Once it is understood that Workflow 3 is affected, the operation management administrator pauses Workflow 3.

Figure 6:
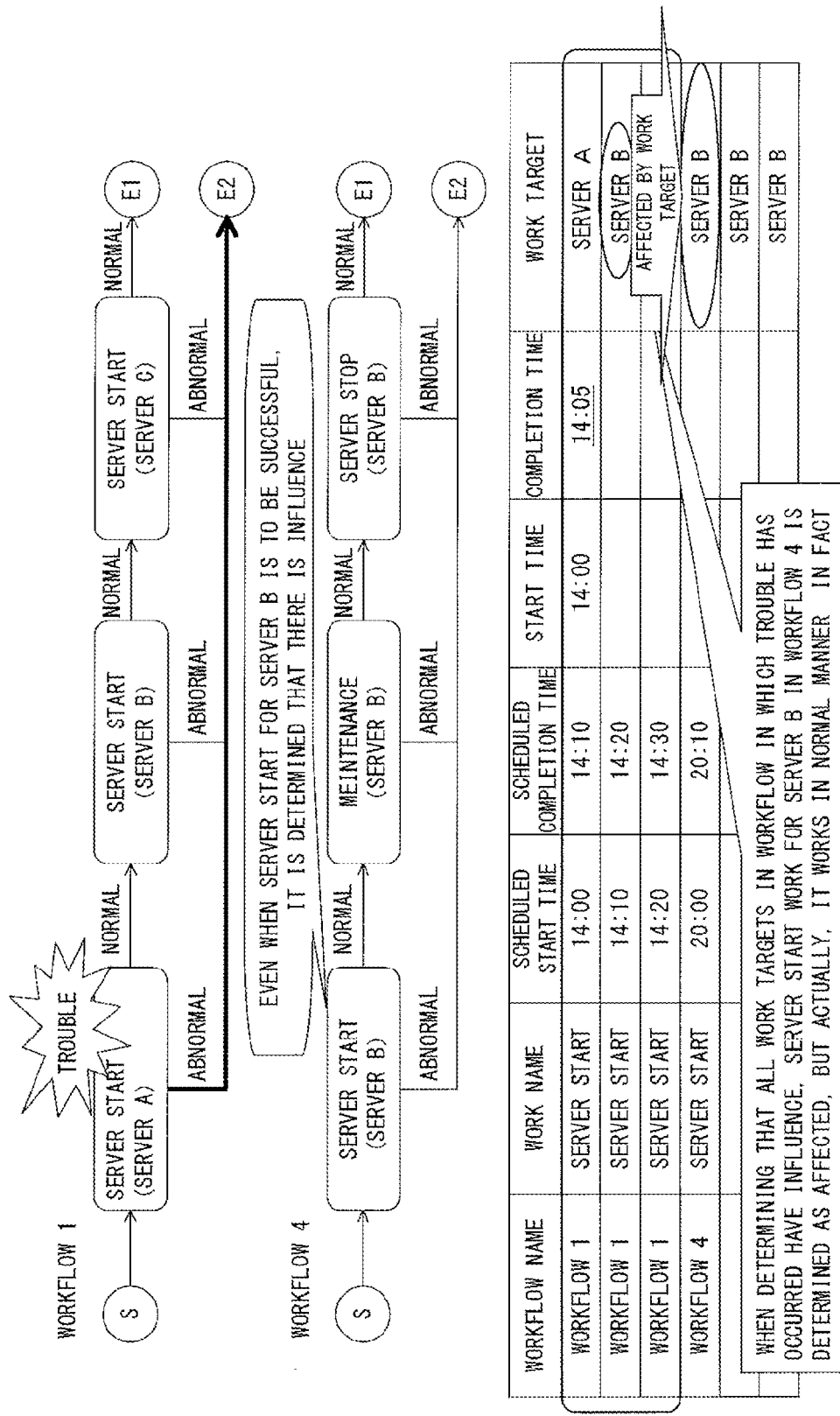
FIG. 6 is a diagram for explaining an instance that is impossible to solve with the fourth technique.

However, when this method is used, an unaffected workflow may be determined as affected in some cases. However, as illustrated in FIG. 6, in Workflow 4, even when a work that does not perform server start for Server B exists due to occurrence of a trouble in regard to server start for Server B, it is determined that a server start work for server B on another workflow has an influence. However, the server start work for server B is not executed due to the trouble, and therefore, the work is not to fail and the server start work is to be done successfully. Once it is found that there is a work influence in Workflow 4, the operation management administrator pauses Workflow 4 that is not to be affected by any work influence.

As described above, there is a problem wherein only by looking at the spread of the influence of work targets, even the works that are to be run in a normal manner are determined as affected.

As described above, when an abnormality occurs in a work, it is necessary to promptly understand the influence on subsequent works. When works that are originally scheduled to be performed in the normal route are not performed due to a transition to the abnormal route, the subsequent works are affected. Therefore, consideration to the influence of works that are not performed is required.

When the abnormal route is taken after occurrence of a trouble, there is a method for statistically determining the influence on subsequent works using past data in which information of work targets are accumulated, in order to determine how subsequent works will be affected.

However, when an attempt is made to analyze the influence on subsequent works using the accumulated past operation history information, it may be impossible to analyze the influence on subsequent works at the time of taking the abnormal route in some cases. This is because, when there is no experience taking the abnormal route, there is no operation history with the abnormal route, and it is impossible to obtain information to be the input for the analysis.

The technique in which the second technique and the third technique are combined is limited to the determination of the affected range that may be directly found from workflow definition information and accompanying definition information (relationship information between the workflows and the work targets, and condition information for determining the influence, as illustrated in FIG. 4).

It is impossible to determine the indirectly-affected range due the subsequent normal route that is originally supposed to be executed not being executed because of the abnormality, only with the workflow definition information and accompanying definition information. In order to solve the problem, an estimation using past data is required. In the third technique, the execution log is checked as a method for identifying the cause of occurrence of a trouble, but the log information is "accumulated past operation history information", and therefore, it is impossible to analyze the influence on subsequent works when using the past data, because there is no experience of taking the abnormal route.

Therefore, in the embodiment, a technique for determining a workflow that is scheduled to be run and that is affected by an abnormality that has occurred in a workflow is explained.

FIG. 7 illustrates an example of a process managing apparatus in the embodiment. The process managing apparatus 1 includes a detecting unit 2, a process identifying unit 3, a procedure identifying unit 4, and an output identifying unit 5.

The detecting unit 2 detects an occurrence of an abnormality in a management target system that sequentially executes a plurality of process procedures (workflows). An example of the detecting unit 2 is a control unit 13 that functions as a WF monitoring unit 17 that executes the process of S16. The management-target system 8 represents a group of one or more management-target servers.

The process identifying unit 3 identifies a process procedure in which the abnormality has occurred from among the plurality of process procedures (workflows) according to the detecting of the occurrence of the abnormality. An example of the process identifying unit 3 is the control unit 13 that functions as the WF monitoring unit 17 that performs the process of S17.

The procedure identifying unit 4 identifies from among the plurality of process procedures a subsequent process procedure that is affected by the abnormality that occurred in the identified process procedure by referring to process procedure information that defines a plurality of operating processes (here, a process refers to operation control components) included in the plurality of process procedures and an order of execution of the plurality of operating processes. An example of the procedure identifying unit 4 is the control unit 13 that functions as the WF monitoring unit 17 that executes the processes of S19, S102 through S106. An example of the process procedure information is a WF management table 21.

The output identifying unit 5 output information that relates to the identified process procedure or the subsequent process procedure, among output information from the plurality of process procedures. An example of the output identifying unit 5 is the control unit 13 that functions as the WF monitoring unit 17 that executes the processes of S79, S106.

With the configuration as described above, a workflow that is scheduled to be run and that is affected by an abnormality that has occurred in another workflow may be determined.

The process identifying unit 3 identifies an information processing apparatus 9 that executes an operating process (an operation control component) included in the identified process procedure from among information processing apparatuses included in the management target system 8. An example of the information processing apparatus 9 is a target server 30 indicated in an affected work target list obtained from processes of S73 through S74 and so on, for example. At this time, the procedure identifying unit 4 determines the subsequent process procedure among other process procedures that are scheduled to be executed after the detecting of the occurrence of the abnormality according to an execution result of the other process procedure. This determination process corresponds to the processes of S19, S91 through S98, and so on, for example.

The process managing apparatus 1 further includes a storing unit 6. The storing unit 6 stores the abnormality check information that includes the check method and an abnormality condition. The check method is a method for checking an abnormality when the abnormality occurs in any of the plurality of operating processes included in the plurality of process procedures. The abnormality condition is a condition for determining the abnormality according to a result of the checking. An example of the storing unit 6 is a storing unit 18. An example of the abnormality check information is an abnormality determination table 22. At this time, using the abnormality check information obtained from the storing unit 6, the process identifying unit 3 executes the check method for process procedures after the detecting of the occurrence of the abnormality. The obtaining process corresponds to S19, S55, S37 for example.

With the configuration as described above, a check method may be executed for operation control components included in workflows executed after an abnormality is detected and execution results may be obtained.

The procedure identifying unit 4 identifies the other process procedures that are executed after the detecting of the occurrence of the abnormality and include the operating process executed by the identified information processing apparatus. The procedure identifying unit 4 determines at least one of the other process procedures to be the subsequent process procedure that is affected by the abnormality that has occurred in the process when any of the execution results of the check method corresponding to the operating process included in the identified other process procedures satisfies the abnormality condition. The determination process corresponds to the processes of S104 through S106, for example.

With the configuration as described above, a workflow that is scheduled to be run and that is affected by an abnormality that has occurred in another workflow may be determined.

The process managing apparatus 1 further includes a display control unit 7. The display control unit 7 displays the subsequent process procedure. An example of the display control unit 7 is the control function that functions as the WF monitoring unit 17 that executes the processes of S80, S107.

With the configuration as described above, a workflow that is scheduled to be run and that is affected by an abnormality that has occurred in another workflow may be displayed.

The abnormality check information further includes cause information that is associated with the check method and the abnormality information and that represents a cause of an abnormality corresponding to the abnormality condition. The display control unit 7 obtains an operating process for which any of execution results of the check method satisfies the abnormality condition among the plurality of operating processes included in the subsequent process procedure. The display control unit 7 obtains the cause information corresponding to the obtained operating process from the abnormality check information. The display control unit 7 displays the obtained cause information and the subsequent process procedure.

With the configuration as described above, together with a workflow that is scheduled to be run and that is affected by an abnormality that has occurred in another workflow, the cause of the abnormality may also be displayed.

Figure 8:
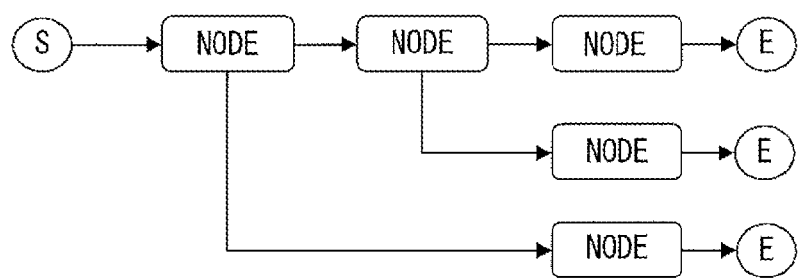
FIG. 8 is diagram for illustrating an automation flow system in the embodiment.

FIG. 8 is a diagram for explaining an automation flow system in this embodiment. The automation flow system is a system realized by an application program with automated expression of a series of control procedures including control information that defines the control for one or more management-target servers. In FIG. 8, the start of the automated flow is indicated as "S", and the end is indicated as "E".

A node refers to each stage on a workflow in which processes are executed for the management-target server in the automation flow system. The process moves to the next node when the process in a node is completed, and the transition between nodes in a workflow is indicated with an arrow. Branching is used when there are different nodes to be the destination of the transition depending on the process result in a node.

Figure 9:
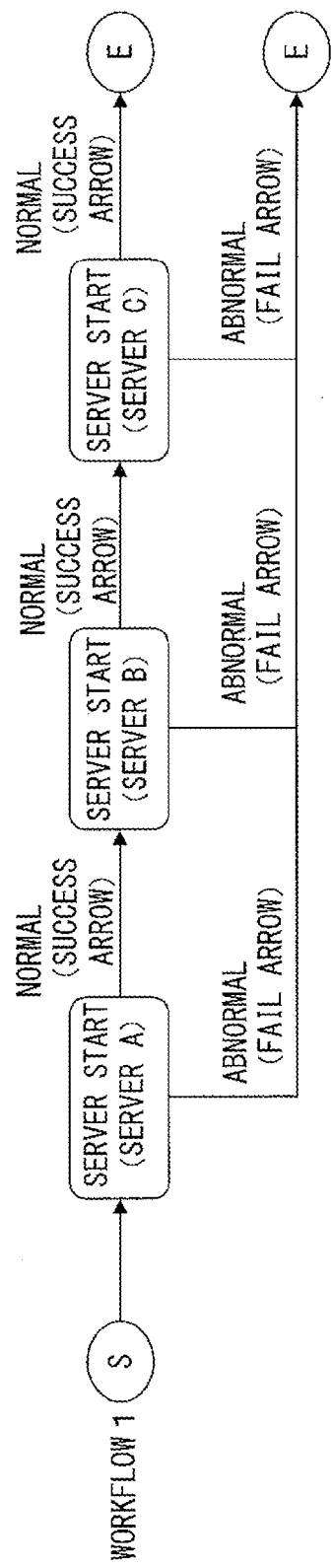
FIG. 9 illustrates an example of a workflow in the embodiment.

FIG. 9 illustrates an example of a workflow in the embodiment. An operation control component is set for a node that forms the workflow. The operation control component is a script described to automatically execute operation control for the management-target server, so as to make the management-target server automatically execute respective processes that constitute a workflow.

As information that indicates transition from a node to another node, as explained in FIG. 8, arrow information is used. The arrow information includes "Success" arrow information that represents a route (normal route) to a node to which transition is performed when the process result in anode is normal, and "Fail" arrow information that represents a route (abnormal route) to a node to which transition is performed when the process result in a node is abnormal.

Figure 10:
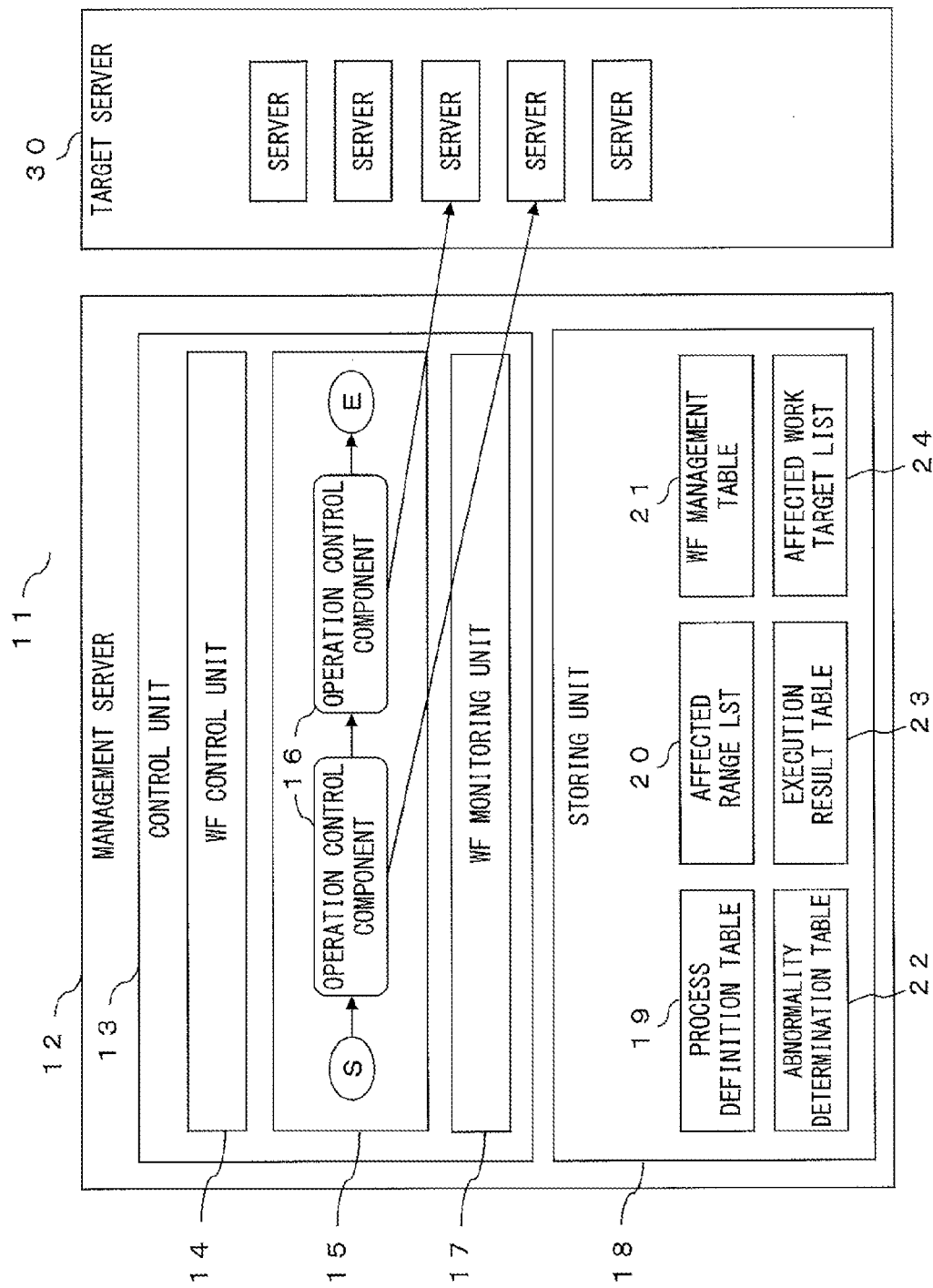
FIG. 10 illustrates an example of a block diagram of the system configuration of an automation flow system in the embodiment.

FIG. 10 illustrates an example of a block diagram of the system configuration of the automation flow system in the embodiment. An automation flow system 11 includes an operation management server (hereinafter, referred to as a "management server"), and a management-target server (hereinafter, referred to as a "target server") 30.

The management server 12 is a server that executes the automation flow system 11 and that also controls the automation flow system 11. The target server 30 is one or more servers that are the management target in the operation automation by the workflow. The management server 12 and the target server 30 are connected by a communication network such as local area network (LAN), the Internet, or the like.

The management server 12 includes the control unit 13, and the storing unit 18. The control unit 13 functions as the WF control unit 14, and the WF monitoring unit 17 by reading and executing a program according to the embodiment from the storing unit 18. The WF control unit 14 and the WF monitoring unit 17 are described later.

The storing unit 18 stores a process definition table 19, an affected range list 20, a workflow (WF) management table 21, an abnormality determination table 22, an execution result table 23, and an affected work target list 24. In the process definition table 19, information related to the process definition (workflow) 15 used in the automation flow system 11 is registered, and operation control components (nodes) 16 that form the workflow are registered.

Hereinafter, a database is referred to as "DB". In addition, hereinafter, a workflow may be referred to as "WF".

FIG. 11 illustrates an example of a process definition table in the embodiment. The process definition table 19 includes data items "Process definition name" 19-1, "Node name" 19-2, "Operation control component name" 19-3, "Node ID" 19-4, "Node type" 19-5, "Arrow name" 19-6, and "Transition destination" 19-7.

"Process definition name" 19-1 stores information that identifies the workflow. "Node name" 19-2 stores type of the node. "Operation control component name" 19-3 stores the name of the operation control component for nodes except the start node and the end node. "Node ID" 19-4 stores information that identifies the node. "Node type" 19-5 stores the type name of the node. "Arrow name" 19-6 stores "Success" arrow information for the case of the normal route and "Fail" arrow information for the case of the abnormal route, as described above. "Transition destination" 19-7 stores the node ID of the node that is the transition destination.

FIG. 12 illustrates an example of an affected range list in the embodiment. The affected range list 20 is list information that is registered in advance for managing works that are affected by a node and that includes data items "Node name" 20-1, and "Affected work" 20-2. "Affected work" 20-2 stores works affected by the execution of "Node name" 20-1.

FIG. 13 illustrates an example of a WF management table in the embodiment. The WF management table 21 includes data items "Process definition name" 21-1, "Node name" 21-2, "Work start time" 21-3, "Work end time" 21-4, "Affected work" 21-5, and "Work target" 21-6.

"Process definition name" 21-1 stores information that identifies the workflow. "Node name" 21-2 stores the name of the node. "Work start time" 21-3 stores the scheduled work start time for the node. "Work end time" 21-4 stores the scheduled work end time for the node. "Affected work" 21-5 stores the content of "Affected work" 21-5 in the WF management table 21 corresponding to the node. "Work target" 21-6 stores the name of the server or the service to be the work target.

FIG. 14A and FIG. 14B are a diagram illustrating an example of an abnormality determination table in the embodiment. FIG. 14A is an example of the abnormality determination table in a case in which the operation control component name is "Start virtual server". FIG. 14B is an example of the abnormality determination table in a case in which the operation control component name is "Stop service".

The abnormality determination table 22 is a table that includes data items "Component name" 22-1, "Control target" 22-2, "Direct cause of abnormality" 22-3, "Result" 22-4, "Check means" 22-5, "Abnormal value" 22-6, "Arrow name" 22-7, and "Classification" 22-8.

"Component name" 22-1 stores the name of the operation control component. "Control target" 22-2 stores the server or the service name to be the control target. "Direct cause of abnormality" 22-3 stores the content about the direct cause of abnormality. "Result" 22-4 stores the execution result caused by "Direct cause of abnormality" 22-3

"Check means" 22-5 stores the means for checking the work in which the abnormality has occurred. "Abnormal value" 22-6 stores information for determining whether or not there is abnormality. "Arrow name" 22-7 stores "Success" arrow information for the case of the normal route and "Fail" arrow information for the case of the abnormal route, as described above. "Classification" 22-8 stores the type (classification) of the abnormality.

FIG. 15 illustrates an example of an execution result table in the embodiment. The execution result table 23 data items "Process definition name" 23-1, "Node name" 23-2, "Work target" 23-3, "Node ID" 23-4, "Check means" 23-5, and "Execution result" 23-6.

"Process definition name" 23-1 stores information that identifies the workflow. "Node name" 23-2 stores the name of the node. Work target" 23-3 stores the name of the server of the service to be the work target.

"Node ID" 23-4 stores information that identifies the node. "Check means" 23-5 stores the means for checking the work in which the abnormality has occurred. "Execution result" 23-6 stores the value obtained as a result of execution of the check means.

Figure 16:
FIG. 16 illustrates an example of an affected work target list in the embodiment.

FIG. 16 illustrates an example of an affected work target list in the embodiment. The affected work target list 24 stores the server name of the work target that is affected by a trouble from the node in which the trouble has occurred.

Hereinafter, flowcharts in FIG. 17 through FIG. 24 are explained with reference to FIG. 25 through FIG. 27.

Figure 17:
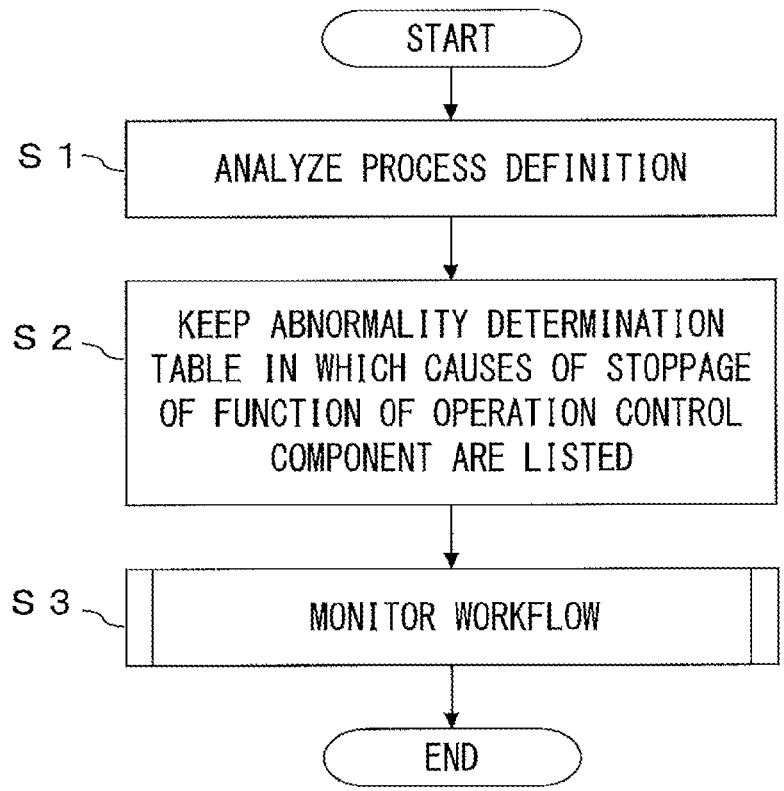
FIG. 17 is a flowchart of the overall processes in the embodiment.

FIG. 17 is a flowchart of the overall processes in the embodiment. First, the WF control unit 14 analyzes the process definition registered in the automation flow system 11 (S1). Here, when the node is registered or updated in the process definition of the automation flow system 11, the WF control unit 14 stores registration information or update information about each node in the process definition table 19.

The WF control unit 14 obtains "Operation control component name", "Work start time", "Work end time", and so on from the operation control components (nodes) that form the process definition (workflow) registered in the automation flow system 11. Then, the WF control unit 14 analyzes the operation control components (nodes) using the obtained information, the process definition table 19 and the affected range list 20.

Here, the WF control unit 14 stores, in the WF management table 21, information for determining whether or not there is an influence from the operation control components (nodes) in the process definition, using the obtained information, the process definition table 19 and the affected range list 20. The information for determining whether or not there is an influence from the operation control components is work information defined for each operation control component. For example, the WF control unit 14 obtains a node name "Server start (A)" from the process definition table 19, and obtains "Affected work" corresponding to "Server start" from the affected range list 20. The WF control unit 14 associates the obtained "Server start" and the obtained "Affected work" and stores them in the WF management table 21. Meanwhile, the WF control unit 14 identifies the server to be work target from the node name "Server start (A)", and stores the obtained work target in "Work target" 21-6. In addition, the WF control unit 14 obtains the work start time and the work end time set for the node from the process definition table 19, and stores them in the WF management table 21.

Next, the WF control unit 14 stores, in the storing unit 18, the abnormality determination table 22 in which causes of stoppage of the function of the operation control component are listed (S2). As illustrated in FIG. 14, the WF control unit 14 stores, in advance in the storing unit 18, the abnormality determination table 22 in which direct causes of abnormality of the operation control component and check means for determining the abnormality in tech node are listed. Accordingly, when an abnormality occurs in an operation control component in a running workflow, the WF control unit is able to execute "Check Means" in the abnormality determination table 22 in regard to the work in which the abnormality of the operation control component has occurred. Then, the WF control unit 14 is able to determine that there is an "abnormality" by comparing the obtained value with "Abnormal value" in the abnormality determination table 22.

Next, the WF monitoring unit 17 monitors the workflow (S3). With occurrence of a trouble in a node and transition to the abnormal route of the process managed in the workflow after the start of the process definition (workflow) as the trigger, the WF monitoring unit 17 performs processes from extraction of affected works to determination and display of the transition destination, by performing the following processes. Details of S3 are explained in FIG. 18.

Figure 18:
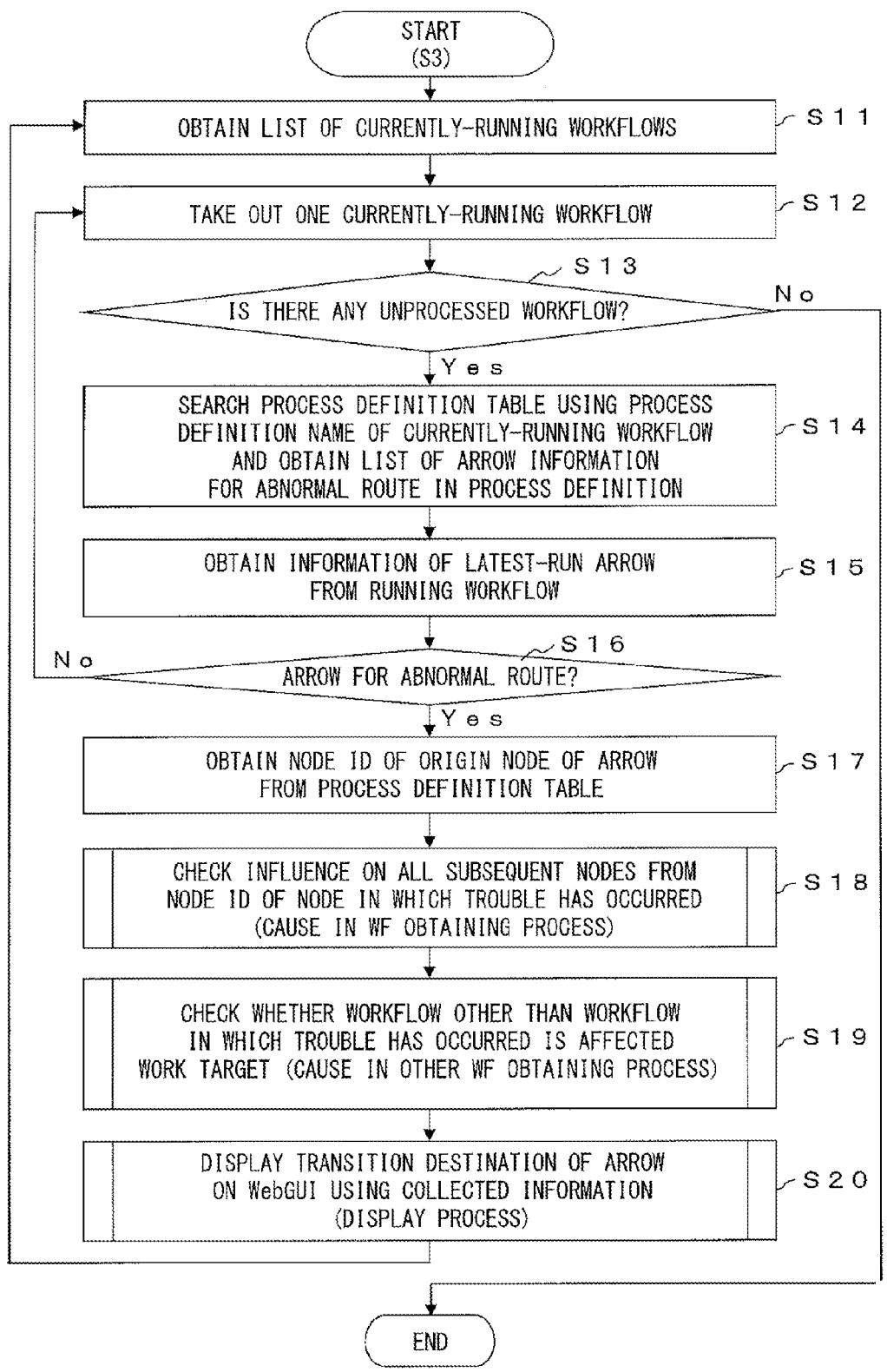
FIG. 18 is a detailed flowchart of a detailed flowchart of a work flow monitoring process (S3) in the embodiment.

FIG. 18 is a detailed flowchart of the work flow monitoring process (S3) in the embodiment. The WF monitoring unit 17 first identifies anode in which a trouble has occurred (S11 through S17). Here, the WF monitoring unit 17 regularly monitors whether transition to the abnormal route is performed from a running node in a workflow. Then, upon detecting the transition of the process from a running node to the abnormal route, the WF monitoring unit 17 identifies the node that is the origin of the transition, from the process definition table 19.

For example, it is assumed that an abnormality occurs in "Server start" node for Server A in Workflow 1 and the process moves to the arrow indicating the abnormal route. In this case, the WF monitoring unit 17 detects the transition of the arrow to the abnormal route, and identifies the "Server start" node for Server A that is the origin of the transition of the arrow in the abnormal route as a trouble-occurrence node.

Specifically, the WF monitoring unit 17 obtains the list of currently-running workflows in the automation flow system from the automation flow system 11 (S11). The WF monitoring unit 17 obtains one unprocessed workflow in regard to S14 and subsequent steps from the list of the working workflows obtained in S11 (S12, S13, "Yes"). When there is no unprocessed workflow in regard to S14 and subsequent steps (S13, "No"), the process in FIG. 18 are terminated.

When one unprocessed workflow in regard to S14 and subsequent steps is obtained, the WF monitoring unit 17 performs the following processes. That is, the WF monitoring unit 17 searches the process definition table 19 using the process definition name of the running workflow, to obtain a list of arrow information for the abnormal route defined in process definition table 19 (S14).

The WF monitoring unit 17 obtains information of latest-run arrow from the running workflow (S15).

When the list of arrow information of the abnormal route is compared with the latest-run node and when the latest-run node has success arrow information that indicates the normal route (S16, "No"), the WF monitoring unit 17 returns to the process in S12. When the list of arrow information of the abnormal route with the latest-run node and when the latest-run node has fail arrow information that indicates the abnormal route (S16, "Yes"), the WF monitoring unit 17 obtains the node ID of the transition-origin node from the arrow, from the process definition table 19 (S17).

Next, in the workflow to which the node in which a trouble has occurred belong, the WF monitoring unit 17 checks whether the nodes that are subsequent to the node in which the trouble has occurred are the work target that is affected by the trouble (a cause in WF obtaining process) (S18). In the workflow to which the node in which a trouble has occurred belongs, the nodes that are scheduled to be run after a node in which a trouble has occurred are often branched into a normal route and an abnormal route, making a tree structure. In that case, the nodes of any route may affect the subsequent flow. For this reason, a direct cause for abnormal of operation control components is identified in regard to all the nodes that are subsequent to the head of the arrow.

For information of the work target of each node, using "Check means" that has been described in the abnormality determination table 22, the WF monitoring unit 17 obtains the execution result with the check means, with the node in which the trouble has occurred as the origin, and stores the obtained execution results (values) in Execution result in the execution result table 23. Details of this cause in WF obtaining process (S18) are explained using FIG. 19. The node ID of the node in which the trouble has occurred is given to the cause in WF obtaining process (S18) as an argument.

Figure 19:
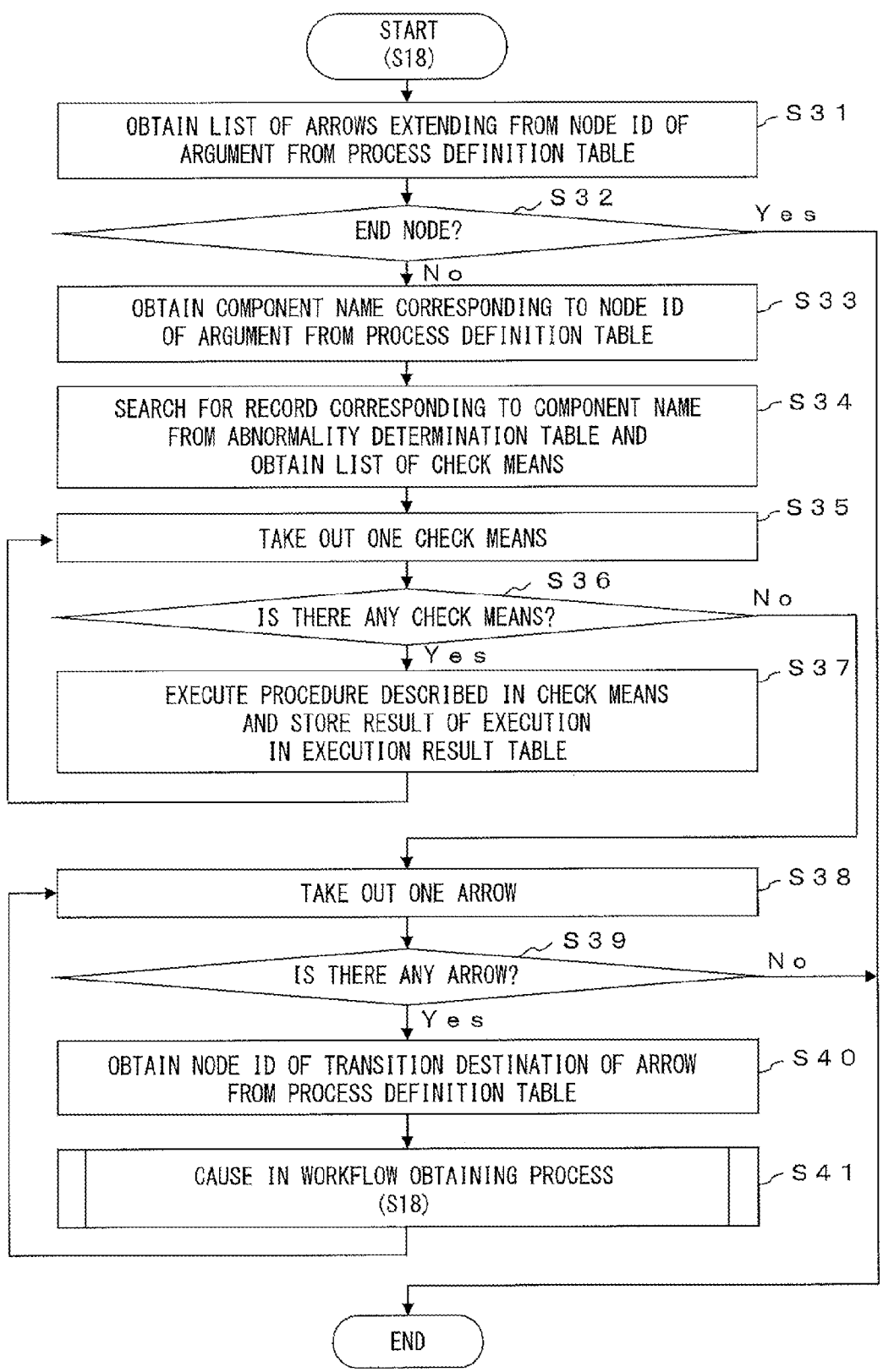
FIG. 19 is a flowchart illustrating details of a cause in WF obtaining process (S18) in the embodiment.

FIG. 19 is a flowchart illustrating details of the cause in WF obtaining process (S18) in the embodiment. Using the node ID given as an argument, the WF monitoring unit 17 obtains a list of arrows extending from the node ID of the argument (S31). When the list of the arrows is not obtained in S31, that is, when the node represented by the node ID of the argument is the end node in the workflow (S32, "Yes"), the flow in FIG. 19 is terminated.

When the list of the arrows is obtained in S31 (S32, "No"), the WF monitoring unit 17 obtains the operation control component name corresponding to the node ID of the argument (S33).

The WF monitoring unit 17 searches for a record corresponding to the operation control component name, and obtains a list of check means corresponding to the operation control component name (S34). The WF monitoring unit 17 takes out one check means from the list obtained in S34 (S35). When a check means is taken out from the obtained list (S36, "Yes"), the WF monitoring unit 17 executes the procedure described in the check means, and stores the result of the execution in the execution result table 23 (S37). The WF monitoring unit repeats the process of S37 for the number of times corresponding to the number of check means obtained in S34.

When the process of S37 is completed for all the check means obtained in S34, the WF monitoring unit 17 takes out one arrow from the list of arrows obtained in S31 (S38). When it is impossible to take out an arrow (S39, "No"), the flow in the FIG. 19 is terminated. When an arrow is taken out (S39, "Yes"), the WF monitoring unit 17 obtains the node ID of the transition destination of the arrow, from the process definition table 19 (S40).

The WF monitoring unit 17 calls the cause in WF obtaining process (S18) again, and executes the cause in WF obtaining process (S18) with the node ID obtained in S40 as the argument (S41).

The WF monitoring unit 17 repeats the process in S40-S41 for all the arrows in the list obtained in S31.

The explanation returns to the flowchart in FIG. 18. In regard to the workflows other than the workflow in which the trouble has occurred, the WF monitoring unit 17 checks whether there is a work target affected by the trouble (a cause in other WF obtaining process) (S19). Here, a check is performed as to whether there is a work target affected by the trouble, sequentially from the start node to the end node for a workflow that has not been started. In regard to information of the work target of each node, the WF monitoring unit 17 obtains the execution result with the "Check means" that has been described in the abnormality determination table 22, stores the obtained execution results (values) in Execution result in the execution result table 23. Details of the cause in other WF obtaining process (S19) are explained using FIG. 20.

Figure 20:
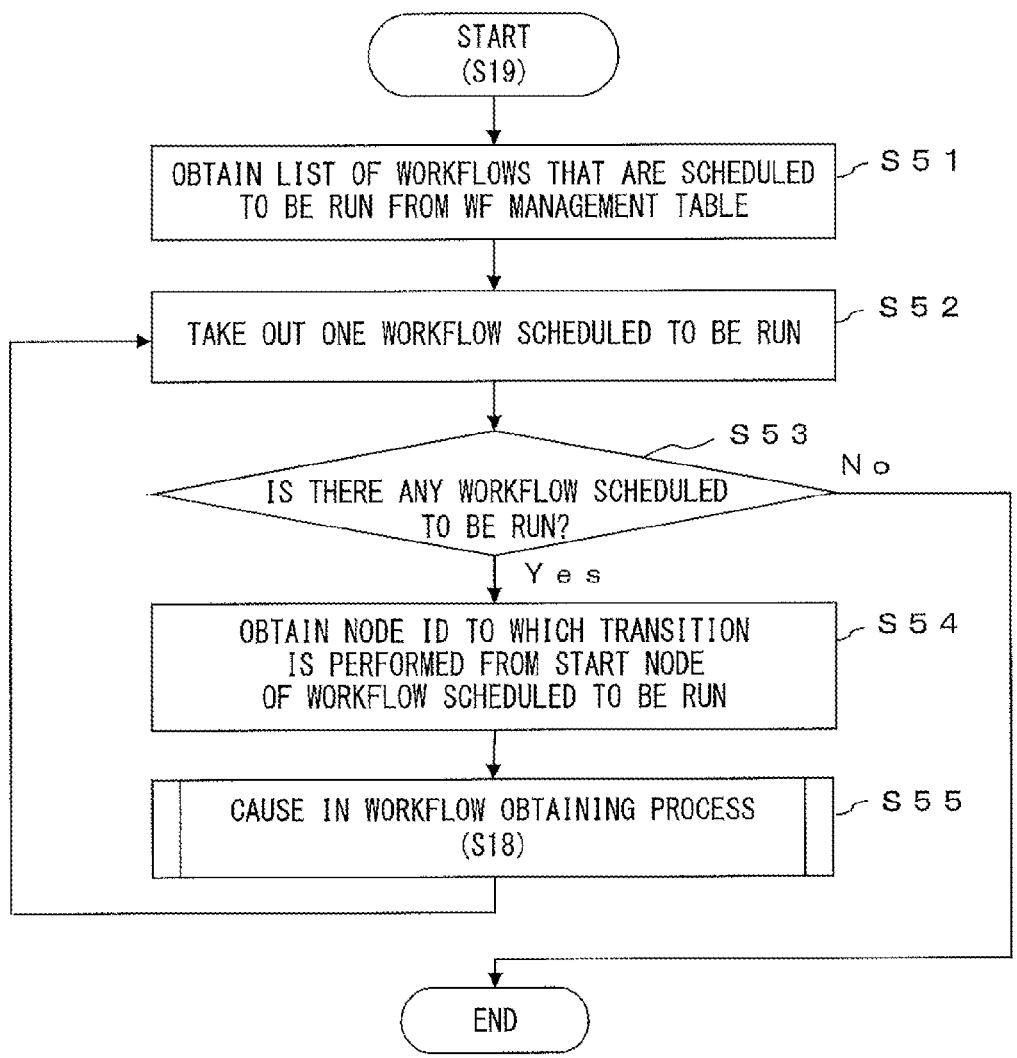
FIG. 20 is a flowchart illustrating details of a cause in other WF obtaining process (S19) in the embodiment.

FIG. 20 is a flowchart illustrating details of the cause in other WF obtaining process (S19) in the embodiment. The WF monitoring unit 17 obtains a list of workflows that are schedule to be run, from the WF management table 21 (S51). For each of the workflows that are scheduled to be run included in the list, The WF monitoring unit 17 obtains a node to which transition is performed from the start node from the process definition table 19 (S52 through S54).

The WF monitoring unit 17 calls the cause in WF obtaining process (S18), and executes the cause in WF obtaining process (S18) with the node ID obtained in S54 as an argument (S55). The process of the cause in WF obtaining process (S18) has been explained in FIG. 19 and is omitted.

The explanation returns to the flowchart in FIG. 18. The WF monitoring unit 17 displays the transition destination of the arrow on a graphical user interface (GUI) using information collected in S18 and S19 (S20). In the embodiment, the transition destination of the arrow is displayed on a Web graphical user interface (GUI) as an example, but this is not a limitation. Details of the display process (S20) are explained using FIG. 21.

Figure 21:
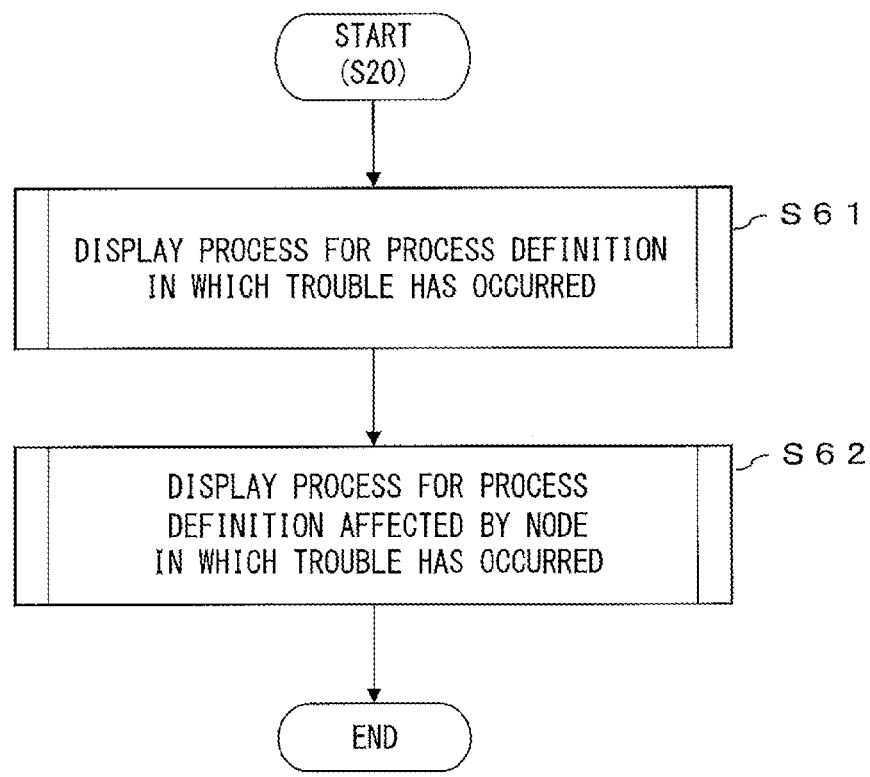
FIG. 21 is a flowchart illustrating details of a display process (S20) in the embodiment.

FIG. 21 is a flowchart illustrating details of the display process (S20) in the embodiment. The WF monitoring unit 17 performs a display process for the process definition (workflow) in which a trouble has occurred (S61). In the workflow in which the trouble has occurred, there are the trouble-occurrence node and the node for which the normal route does not work. In regard to the trouble-occurrence node, the WF monitoring unit 17 obtains "Execution result" from the execution result table 23 and obtains "Abnormal value" from the abnormality determination table 22. When "Execution result" corresponds to "Abnormal value", the WF monitoring unit 17 determines that there is an abnormality. Meanwhile, in S61, in regard to the node for which the normal route does not work, the WF monitoring unit 17 obtains the work target according to the operation control component name of the node, from the WF management table 21 and stores it in the affected work target list 24 as shown in FIG. 16. The process of S61 is described later in FIG. 25.

Next, the WF monitoring unit 17 displays process definition affected by the node in which the trouble has occurred (S62). The work target affected by the node in which the trouble has occurred is stored in the affected work target list 24, and therefore, the WF monitoring unit 17 obtains a list of process definitions in which the work target is included, from the WF management table 21. The WF monitoring unit 17 obtains "Execution result" set in the execution result table 23 and "Abnormal value" set in the abnormality determination table 22, sequentially from the start node of the obtained process definition. When "Execution result" corresponds to the "Abnormal value", the WF monitoring unit 17 determines that the execution result for the node is abnormal. The process in S62 is described later in FIG. 26.

FIG. 25 is a diagram for explaining evaluation of the execution result with the check means in regard to nodes on a workflow in which a trouble has occurred in the embodiment. FIG. 26 is a diagram for explaining evaluation of the execution result with the check means in regard to nodes on a workflow other than the workflow in which a trouble has occurred in the embodiment. FIG. 25 and FIG. 26 compare the execution result and the abnormal value in regard to S61 and S62 and illustrate the execution result corresponding to the abnormal value in a way that is easy to understand.

For example, in FIG. 25, it is assumed that the trouble-occurrence node is a node "Server start" of Workflow 1 (the work target is assumed as Server A). The execution result (CPU: None) with the obtaining process for setting information of the virtual machine corresponds to "Abnormal value" for the execution result and therefore, the WF monitoring unit 17 determines that there is an abnormality. In the same manner, in regard to FIG. 26, when the execution result (CPU: None) with the obtaining process for setting information of the virtual machine corresponding to "Abnormal value" for the execution result (the portion enclosed in the thick frame), the WF monitoring unit 17 determines that the node corresponding to the abnormal value is abnormal.

Meanwhile, in FIG. 25, the node (Server start for Server B) that was not executed due to the trouble is also illustrated in Workflow 1, For Server start for Server B, the execution result that represents abnormality has not been obtained, and therefore, the WF monitoring unit 17 determines that Workflow 1 is not affected. The same execution result is obtained for Server start for Server B in Workflow 4, and the WF monitoring unit 17 determines Workflow 4 is not affected either.

Figure 27:
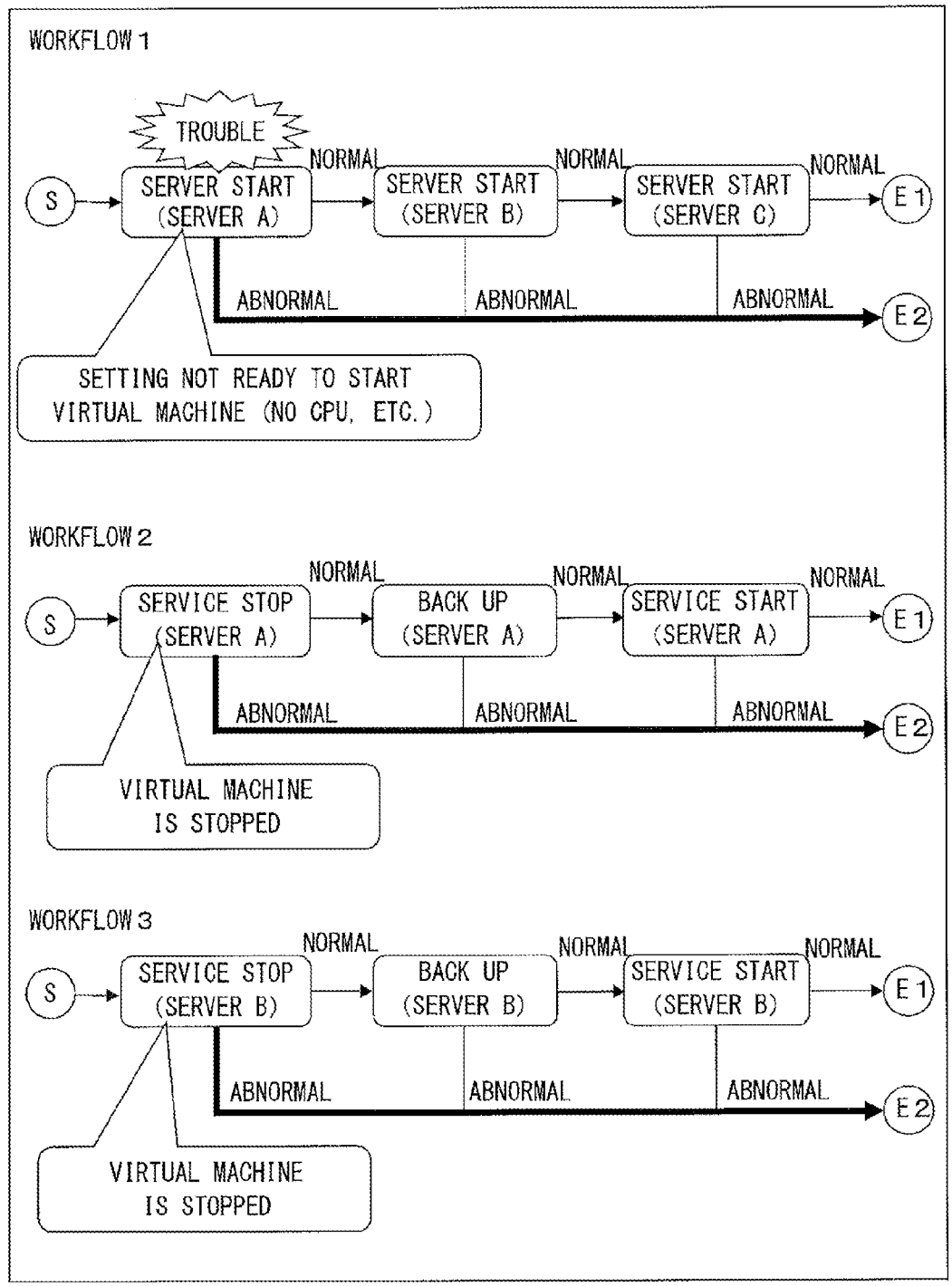
FIG. 27 is a display example in the embodiment.

The WF monitoring unit 17 displays the transition destination of the arrow on the workflow in regard to the node in which the trouble has occurred, and displays the direct cause of abnormality for the operation control component in a popup or the like, as illustrated in FIG. 27.

Hereinafter, details of the display process (S61) for the process definition in which a trouble has occurred are described using FIG. 22.

Figure 22:
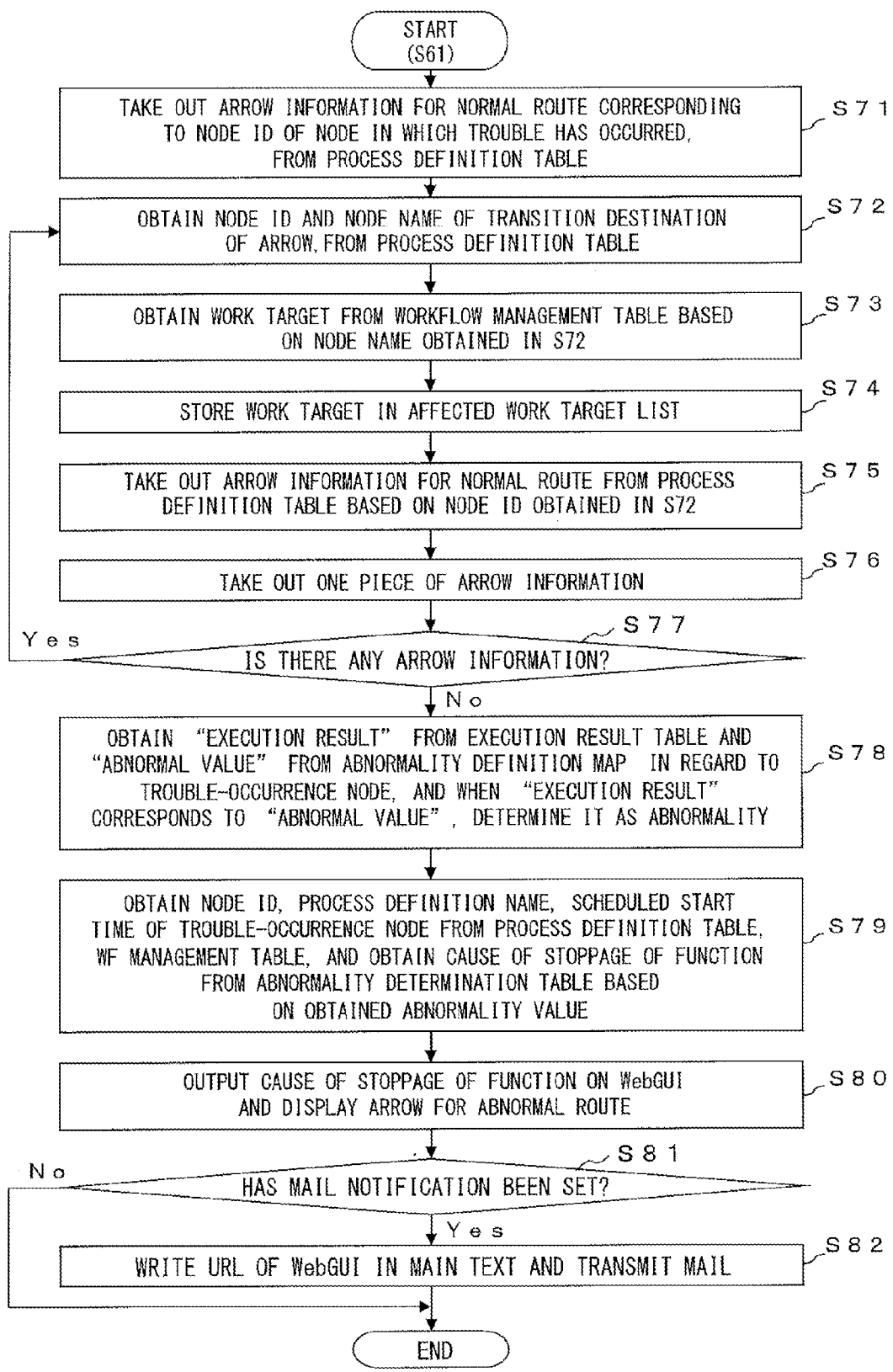
FIG. 22 is a flowchart illustrating details of a display process (S61) for a process definition in which a trouble has occurred in the embodiment.

FIG. 22 is a flowchart illustrating details of the display process (S61) for the process definition in which a trouble has occurred in the embodiment. The WF monitoring unit 17 takes out arrow information for the normal route corresponding to the node ID of the node in which a trouble has occurred, from the process definition table 19 (S71).

Using the obtained arrow information, the WF monitoring unit 17 obtains the node ID and the node name of the transition destination of the arrow, from the process definition table 19 (S72). Based on the node name obtained in S72, the WF monitoring unit 17 obtains the work target from the WF management table 21 (S73). The WF monitoring unit 17 stores the work target obtained in S73 in the affected work target list 24 (S74).

The WF monitoring unit 17 takes out arrow information for the normal route in regard to the node ID obtained in S72, from the process definition table 19 (S75). The WF monitoring unit 17 takes out one piece of arrow information from the obtained arrow information for the normal route (S76). When there is arrow information in S76 (S77, "Yes"), the WF monitoring unit 17 proceeds to the process in S72, and performs the process of S72 and subsequent processes in regard to the node of the transition destination indicated by the arrow. The processes of S72 through S76 are sequentially repeated for nodes that are subsequent to the node in which the trouble has occurred.

When there is no arrow information in S76 (S77, "No"), that is, in the case of the end node, the WF monitoring unit 17 performs the following process. That is, the WF monitoring unit 17 obtains "Execution result" from the execution result table 23 and "Abnormal value" from the abnormality determination table 22, in regard to the trouble-occurrence node. When "Execution result" corresponds to "Abnormal value", the WF monitoring unit 17 determines that there is an abnormality (S78).

The WF monitoring unit 17 obtains the scheduled start time from the process definition table 19 and the WF management table 21 using the node ID and the process definition name of the trouble-occurrence node. The WF monitoring unit 17 further obtains "Direct cause of abnormality" for the record that was determined as abnormal in S78 from the abnormality determination table 22, using the node ID of the trouble-occurrence node (S79).

The WF monitoring unit 17 outputs the reason of stoppage of the function of the node (direct cause of abnormality) on a WebGUI using the information obtained in S79, and further displays arrow for the abnormal route (S80).

When mail notification has been set (S81, "Yes"), the WF monitoring unit 17 writes the URL (Uniform Resource Locator) of the WebGUI in the main text, and transmits an electronic mail to the mail address set in advance (S82).

Figure 23:
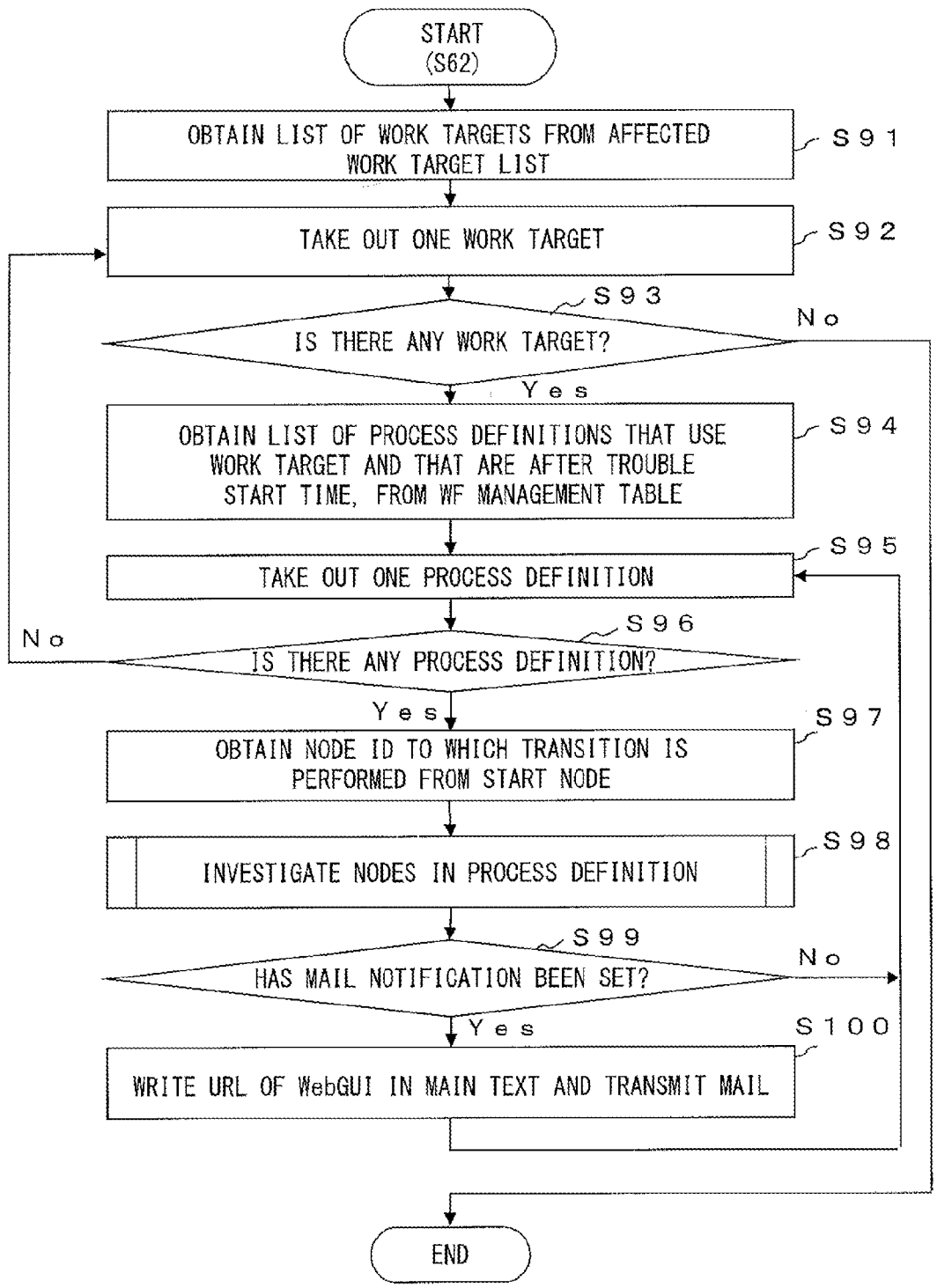
FIG. 23 is a flowchart illustrating details of a display process (S62) for a process definition affected by a node in which a trouble has occurred in the embodiment.

Next, details of the display process (S62) for the process definition affected by the node in which a trouble has occurred are described using FIG. 23 and FIG. 24.

FIG. 23 is a flowchart of details of the display process (S62) for the process definition affected by the node in which a trouble has occurred in the embodiment. The WF monitoring unit 17 obtains a list of work targets from the affected work target list 24 (S91). The WF monitoring unit 17 takes out one work target from the list obtained in S91 (S92). When there is no work target in S91 (S93, "No"), this flow is terminated.

When there is an obtained work target (S93, "Yes"), the WF monitoring unit 17 obtains a list of the process definitions that use the work target and that are process definitions after the trouble start time (S94).

The WF monitoring unit 17 takes out one process definition from the list obtained in S94 (S95). When there is no process definition that may be obtained in S95 (S96, "No"), the WF monitoring unit 17 returns to S92, takes out next one work target from the list obtained in S91, and performs the process of S93 and subsequent processes.

When there is a process definition that may be obtained in S95 (S96, "Yes"), the WF monitoring unit 17 obtains the node ID to which transition is performed from the start node in the process definition (S97). The WF monitoring unit 17 investigates nodes in the process definition using the node ID obtained in S97 (S98). S98 is explained using FIG. 24.

When mail notification has been set (S99, "Yes"), the WF monitoring unit 17 writes the URL of the WebGUI in the main text, and transmits an electronic mail to the main address set in advance (S100).

The processes in S95 through S100 are repeated for the number of times corresponding to the number of process definitions obtained in S94.

FIG. 24 is a flowchart illustrating the detail process in S98. When the node ID indicated by the node ID obtained in S97 is the end node in the process definition (S101, "Yes"), the flow in FIG. 24 is terminated. When the node ID indicated by the node ID obtained in S97 is not the end node in the process definition (S101, "No"), the WF monitoring unit 17 obtains the operation control component name based on the node ID from the process definition table 19 (S102).

The WF monitoring unit 17 obtains the execution result stored in the execution result table 23 and the abnormal value stored in the abnormality determination table 22, based on the process definition name, the node ID, and the operation control component name (S103). When there is no execution result corresponding to the abnormal value (S104, "No"), the process proceeds to the process in S108.

When there is one or more execution results corresponding to the abnormal value (S104, "Yes"), the WF monitoring unit 17 performs the following process. That is, the WF monitoring unit 17 refers to the WF management table 21, to determine whether the operation control component obtained in S102 is an operation control component that uses the work target stored in the affected work target list 24 (S105). When the operation control component obtained in S102 is not an operation control component that uses the work target stored in the affected work target list 24 (S105, "No"), the process proceeds to the process in S108.

When S102 the operation control component obtained in S102 is an operation control component that uses the work target stored in the affected work target list 24 (S105, "Yes"), the WF monitoring unit 17 performs the following process. That is, based on the node ID, the WF monitoring unit 17 obtains "Process definition name" and "Scheduled start time" from the WF management table 21, and obtains "Direct cause of abnormality" from the abnormality determination table 22 (S106).

The WF monitoring unit 17 outputs the reason of stoppage of the function of the node (direct cause of abnormality) on a WebGUI using the information obtained in S79, and further displays arrow for the abnormal route (S107).

The WF monitoring unit 17 obtains the node ID to which transition is to be performed next, from the WF management table 21 (S108), and the process returns to the process of S101. The processes of S101 through S108 are performed until the processes are completed for all the nodes in the process definition (workflow).

Meanwhile, in the embodiment, the display is not limited to the Web-GUI, and the node determined as abnormal, the transition destination, and the direct cause of abnormality for the operation control component may be reported using a common notification means to the administrator such as a mail. The notification is not only the mail and may be passed to other functions (event log notification, message notification to another server).

According to the embodiment, work influence on other workflows from lack of running in the normal route due to a trouble may be understood. In addition, it is possible not only tot understand the work influence on subsequent works but also to present the direct cause of abnormality of the operation control component and the transition destination. In addition, by understanding the influence of a trouble and the direct cause of abnormality of the operation control component, it becomes possible to take a measure (to stop the workflow in advance so as to prevent the influence from spreading/to postpone the operation of the workflow) in advance before the affected workflow is run and fails to work in the normal manner.

FIG. 28 is an example of a configuration block diagram of the hardware environment of a computer that executes a program in an example in the embodiment. A computer 11 functions as a management server 12. The computer 11 is constituted by a CPU 42, a ROM 43, a RAM 46, a communication I/F 44, a storage apparatus 47, an output I/F 41, an input I/F 45, a reading apparatus 48, a bus 49, an output device 51, and an input device 52.

Here, the CPU represents a central processing unit. The ROM represents a read-only memory. The RAM represents a random access memory. The I/F represents an interface. The CPU 42, the ROM 43, the RAM 46, the communication I/F 44, the storage apparatus 47, the output I/F 41, the input I/F 45, and the reading apparatus 48 are connected to the bus 49. The reading apparatus 48 is an apparatus for reading a portable recording medium. The output device 51 is connected to the output I/F 41. The input device 52 is connected to the input I/F 45.

Storage apparatuses in various formats such as a hard disk, a flash memory, a magnetic disk, and the like, may be used as the storage apparatus 47. The storage apparatus 47 or the ROM 43 stores a program that makes the CPU 42 function as the automation flow system 11, and a program according to the embodiment are stored. The storage apparatus 47 further stores, as the storing unit 18, the process definition table 19, the affected range table 20, the WF management table 21, abnormality determination table 22, the execution result table 23, and the affected work target list 24.

The CPU 42 reads out a program that realizes processes explained in the embodiment described above and that is stored in the storage apparatus 47 or the like and executes the program, to function as the WF control unit 14 and the WF monitoring unit 17.

The program that realizes processes explained in the embodiment described above may be stored by the program-provider side in the storage apparatus 47 for example, via a communication network and the communication I/F 44. In addition, the program that realizes processes explained in the embodiment described above may be stored in a portable storage medium that is commercially sold and distributed. In this case, the portable storage medium may be set in the reading apparatus 48, and the content may be read and executed by the CPU 42. Storage media in various formats such as a CD-ROM, a flexible disk, an optical disk, and magneto-optical disk, an IC card, a USB memory apparatus, and the like may be used as the portable storage medium. The program stored in such a storage medium is read by the reading apparatus 48.

Meanwhile, a keyboard, a mouse, a digital camera, a web camera, a microphone, a scanner, a sensor, a tablet, or the like may be used as the input device 52. Meanwhile, a display, a printer, a speaker, or the like may be used as the output device 51. In addition, the network 50 may be a communication network such as the Internet, LAN, WAN, a dedicated line, a wired or wireless communication network.

When the embodiment is not applied, the influence on the subsequent works is understood only for a trouble with a delay from the scheduled completion time for the work, but with this method, it is impossible to respond to a need for understanding the influence on the subsequent at the time of occurrence of a trouble without delay from the scheduled completion time.

However, by applying the embodiment, it becomes possible to identify the direct cause of abnormality of the operation control component that is the factor that generates the influence on works and to identify the transition destination for subsequent nodes, focusing on abnormal data at the time when the trouble occurs. Accordingly, it becomes possible to accurately estimate the future state of the work target with the normal route not being taken, and also to find out the influence on other workflows, based on the work information.

According to an aspect of the embodiment, a workflow that is scheduled to be run and that is affected by an abnormality that has occurred in another workflow may be identified.

Meanwhile, the present invention is not limited to the embodiment described above, and may take various configurations or embodiments without departing from the spirit and scope of the present invention.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

The invention claimed is:

1. A non-transitory computer-readable recording medium having stored therein a process managing program for causing a computer to execute a managing process comprising:
    detecting an occurrence of an abnormality in a management target system that sequentially executes a plurality of process procedures;
    identifying an abnormal process procedure in which the abnormality has occurred from among the plurality of process procedures according to the detecting of the occurrence of the abnormality;
    identifying from among the plurality of process procedures a subsequent process procedure that is affected by the abnormality that occurred in the abnormal process procedure by referring to process procedure information that defines a plurality of operating processes included in the plurality of process procedures and an order of execution of the plurality of operating processes; and
    identifying output information that relates to the identified process procedure or the subsequent process procedure, among output information from the plurality of process procedures.

2. The non-transitory computer-readable recording medium according to claim 1, wherein
    the identifying the abnormal process procedure identifies an information processing apparatus that executes an operating process included in the abnormal process procedure from among information processing apparatuses included in the management target system; and
    the identifying the subsequent process procedure includes determining the subsequent process procedure among other process procedures that are scheduled to be executed after the detecting of the occurrence of the abnormality according to an execution result of the other process procedures.

3. The non-transitory computer-readable recording medium according to claim 2, wherein
    the determining the subsequent process procedure executes a check method for process procedures after the detecting of the occurrence of the abnormality using abnormality check information obtained from a storage that stores the abnormality check information that includes the check method and an abnormality condition, the check method being a method for checking the abnormality when the abnormality occurs in any of the plurality of operating processes included in the plurality of process procedures, the abnormality condition being a condition for determining the abnormality according to a result of the checking, and obtains execution results of the check method.

4. The non-transitory computer-readable recording medium according to claim 3, wherein
    the determining the subsequent process procedure identifies the other process procedures that are executed after the detecting of the occurrence of the abnormality and include the operating process executed by the identified information processing apparatus, and determines at least one of the other process procedures to be the subsequent process procedure that is affected by the abnormality that occurred in the abnormal process procedure when any of the execution results of the check method corresponding to the operating process included in the identified other process procedures satisfies the abnormality condition.

5. The non-transitory computer-readable recording medium according to claim 4, the managing process further comprising:
    performing a display of the subsequent process procedure, wherein
    the abnormality check information further includes cause information that is associated with the check method and the abnormality information and that represents a cause of an abnormality corresponding to the abnormality condition; and
    the performing a display obtains an operating process for which any of execution results of the check method satisfies the abnormality condition among the plurality of operating processes included in the subsequent process procedure, obtains the cause information corresponding to the obtained operating process from the abnormality check information, and displays the obtained cause information and the subsequent process procedure.

6. A process managing apparatus comprising
    a controller that executes a managing process including:
        detecting an occurrence of an abnormality in a management target system that sequentially executes a plurality of process procedures;
        identifying an abnormal process procedure in which the abnormality has occurred from among the plurality of process procedures according to the detecting of the occurrence of the abnormality;
        identifying from among the plurality of process procedures a subsequent process procedure that is affected by the abnormality that occurred in the abnormal process procedure by referring to process procedure information that defines a plurality of operating processes included in the plurality of process procedures and an order of execution of the plurality of operating processes; and
        identifying output information that relates to the identified process procedure or the subsequent process procedure, among output information from the plurality of process procedures.

7. The process managing apparatus according to claim 6, wherein
    the identifying the abnormal process procedure identifies an information processing apparatus that executes an operating process included in the abnormal process procedure from among information processing apparatuses included in the management target system; and
    the identifying the subsequent process procedure includes determining the subsequent process procedure among other process procedures that are scheduled to be executed after the detecting of the occurrence of the abnormality according to an execution result of the other process procedures.

8. The process managing apparatus according to claim 7, the process managing apparatus further comprising
    a storage that stores abnormality check information that includes a check method and an abnormality condition, the check method being a method for checking the abnormality when the abnormality occurs in any of the plurality of operating processes included in the plurality of process procedures, the abnormality condition being a condition for determining the abnormality according to a result of the checking, wherein
    the determining the subsequent process executes, using the abnormality check information obtained from the storage, the check method for process procedures after the detecting of the occurrence of the abnormality, and obtains execution results of the check method.

9. The process managing apparatus according to claim 8, the determining the subsequent process procedure identifies the other process procedures that are executed after the detecting of the occurrence of the abnormality and include the operating process executed by the identified information processing apparatus, and determines at least one of the other process procedures to be the subsequent process procedure that is affected by the abnormality that occurred in the abnormal process procedure when any of the execution results of the check method corresponding to the operating process included in the identified other process procedures satisfies the abnormality condition.

10. The process managing apparatus according to claim 9, wherein
the managing process further includes performing a display of the subsequent process procedure,
the abnormality check information further includes cause information that is associated with the check method and the abnormality information and that represents a cause of an abnormality corresponding to the abnormality condition; and
the performing a display obtains an operating process for which any of execution results of the check method satisfies the abnormality condition among the plurality of operating processes included in the subsequent process procedure, obtains the cause information corresponding to the obtained operating process from the abnormality check information, and displays the obtained cause information and the subsequent process procedure.

11. A process managing method comprising:
detecting an occurrence of an abnormality in a management target system that sequentially executes a plurality of process procedures;
identifying an abnormal process procedure in which the abnormality has occurred from among the plurality of process procedures according to the detecting of the occurrence of the abnormality;
identifying from among the plurality of process procedures a subsequent process procedure that is affected by the abnormality that occurred in the abnormal process procedure by referring to process procedure information that defines a plurality of operating processes included in the plurality of process procedures and an order of execution of the plurality of operating processes; and
identifying output information that relates to the identified process procedure or the subsequent process procedure, among output information from the plurality of process procedures.

12. The process managing method according to claim 11, wherein
the identifying the abnormal process procedure identifies an information processing apparatus that executes an operating process included in the abnormal process procedure from among information processing apparatuses included in the management target system; and
the identifying the subsequent process procedure includes determining the subsequent process procedure among other process procedures that are scheduled to be executed after the detecting of the occurrence of the abnormality according to an execution result of the other process procedures.

13. The process managing method according to claim 12, wherein
the determining the subsequent process procedure executes a check method for process procedures after the detecting of the occurrence of the abnormality using abnormality check information obtained from a storage that stores the abnormality check information that includes the check method and an abnormality condition, the check method being a method for checking the abnormality when the abnormality occurs in any of the plurality of operating processes included in the plurality of process procedures, the abnormality condition being a condition for determining the abnormality according to a result of the checking, and obtains execution results of the check method.

14. The process managing method according to claim 13, wherein
the determining the subsequent process procedure identifies the other process procedures that are executed after the detecting of the occurrence of the abnormality and include the operating process executed by the identified information processing apparatus, and determines at least one of the other process procedures to be the subsequent process procedure that is affected by the abnormality that occurred in the abnormal process procedure when any of the execution results of the check method corresponding to the operating process included in the identified other process procedures satisfies the abnormality condition.

15. The process managing method according to claim 14, the process managing method further comprising
performing a display of the subsequent process procedure, wherein
the abnormality check information further includes cause information that is associated with the check method and the abnormality information and that represents a cause of an abnormality corresponding to the abnormality condition; and
the performing a display obtains an operating process for which any of execution results of the check method satisfies the abnormality condition among the plurality of operating processes included in the subsequent process procedure, obtains the cause information corresponding to the obtained operating process from the abnormality check information, and displays the obtained cause information and the subsequent process procedure.

* * * * *